United States Patent
Khoryaev et al.

(10) Patent No.: US 10,798,673 B2
(45) Date of Patent: Oct. 6, 2020

(54) AUTONOMOUS RESOURCE SELECTION FOR VEHICLE-TO-VEHICLE SIDELINK COMMUNICATIONS

(71) Applicant: Apple Inc., Cupertino, CA (US)

(72) Inventors: Alexey Khoryaev, Nizhny Novgorod (RU); Sergey Panteleev, Nizhny Novgorod (RU); Sergey Sosnin, Zavolzhie (RU); Andrey Chervyakov, Nizhny Novgorod (RU); Dmitry Belov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/080,559

(22) PCT Filed: Aug. 1, 2016

(86) PCT No.: PCT/US2016/045017
§ 371 (c)(1),
(2) Date: Aug. 28, 2018

(87) PCT Pub. No.: WO2017/171909
PCT Pub. Date: Oct. 5, 2017

(65) Prior Publication Data
US 2019/0059071 A1    Feb. 21, 2019

Related U.S. Application Data

(60) Provisional application No. 62/317,198, filed on Apr. 1, 2016.

(51) Int. Cl.
*H04W 64/00*    (2009.01)
*H04W 4/021*   (2018.01)
(Continued)

(52) U.S. Cl.
CPC ......... *H04W 64/006* (2013.01); *H04W 4/021* (2013.01); *H04W 4/027* (2013.01);
(Continued)

(58) Field of Classification Search
CPC ..... H04W 64/006; H04W 4/46; H04W 76/14; H04W 4/021; H04W 4/027;
(Continued)

(56) References Cited

U.S. PATENT DOCUMENTS

2011/0026543 A1   2/2011  Nakaya et al.
2012/0134336 A1*  5/2012  Nakaya et al.

FOREIGN PATENT DOCUMENTS

WO    2009/004699 A1    1/2009

OTHER PUBLICATIONS

International Patent Office—International Search Report and Written Opinion dated Dec. 6, 2016 from International Application No. PCT/US2016/045017, 25 pages.

(Continued)

*Primary Examiner* — Marsha D Banks Harold
*Assistant Examiner* — Dharmesh J Patel
(74) *Attorney, Agent, or Firm* — Fish & Richardson P.C.

(57) ABSTRACT

Methods, systems, and storage media for reporting geo-information in wireless communications networks are described. In embodiments, a roadside unit (RSU) may instruct or configure a user equipment (UE) to report its geo-information to other UEs and/or receive other geo-information from the other UEs over vehicle-to-vehicle (V2V) sidelinks. In embodiments, the RSU or a core network element may allocate radio resources for V2V communications to geographic areas and/or based on reported geo-information. In embodiments, the UE may use its geo-information and/or the obtained geo-information to select (Continued)

resources from the allocation for transmission or receipt of V2V messages. Other embodiments may be described and/or claimed.

22 Claims, 11 Drawing Sheets

(51) Int. Cl.
```
H04W 72/02    (2009.01)
H04W 4/46     (2018.01)
H04W 76/14    (2018.01)
H04W 4/02     (2018.01)
H04W 56/00    (2009.01)
H04W 72/04    (2009.01)
H04W 4/70     (2018.01)
```
(52) U.S. Cl.
CPC ........... *H04W 4/46* (2018.02); *H04W 56/001* (2013.01); *H04W 72/02* (2013.01); *H04W 76/14* (2018.02); *H04W 4/02* (2013.01); *H04W 4/70* (2018.02); *H04W 72/048* (2013.01)

(58) Field of Classification Search
CPC ..... H04W 56/001; H04W 72/02; H04W 4/70; H04W 72/04; H04W 24/02; H04L 5/0048; H04L 67/34; H04L 5/0007; Y02D 70/00; Y02D 70/1224; Y02D 70/1244; Y02D 70/1246; Y02D 70/1262; Y02D 70/142; Y02D 70/144; Y02D 70/146; H04N 21/25825; G06F 9/45533; H04B 17/27; H04B 17/318
See application file for complete search history.

(56) References Cited

OTHER PUBLICATIONS

Intel Corporation, "Support of geo-based transmission schemes for V2V communication," 3GPP TSG RAN WG1 Meeting #84, R1-160431, Agenda Item: 7.3.2.2.1, Feb. 15-19, 2016, St Julian's, Malta, 9 pages.

Intel Corporation, "Sidelink Synchronization Enhancements for V2V Communication," 3GPP TSG RAN WG1 Meeting #84, R1-160702, Agenda Item: 7.3.2.4, Feb. 15-19, 2016, St Julian's, Malta, 9 pages.

PCT International Preliminary Report on Patentability in International Appln. No. PCT/US2016/045017, dated Oct. 2, 2018, 8 pages.

* cited by examiner

AUTONOMOUS RESOURCE SELECTION FOR VEHICLE-TO-VEHICLE SIDELINK COMMUNICATIONS

RELATED APPLICATIONS

The present application is a national phase entry under 35 U.S.C. § 371 of International Application No. PCT/US2016/045017, filed Aug. 1, 2016, entitled "AUTONOMOUS RESOURCE SELECTION FOR VEHICLE-TO-VEHICLE SIDELINK COMMUNICATIONS", which designates the United States of America, which claims priority under 35 U.S.C. § 119 to U.S. Provisional Application No. 62/317,198 filed on Apr. 1, 2016, the entire disclosures of which are hereby incorporated by reference in their entireties.

FIELD

Implementations of the claimed invention generally relate to the field of wireless communications, and in particular, to allocation and selection of radio frequency resources for vehicle-to-vehicle sidelink transmissions.

BACKGROUND

Vehicle-to-vehicle (V2V) communications is an emerging field in wireless communications. V2V allows vehicles to communicate with each other to support various V2V applications, such as safety applications and autonomous operation/driving applications. V2V applications typically require high reliability of packet delivery within a predefined target communication range, and typically require very low latency packet delivery. These requirements may be difficult to achieve due to the ad-hoc nature of V2V communications.

In many deployment scenarios, a network element may be used to allocate and schedule radio frequency transmissions in order to meet the aforementioned requirements.

However, using a network element for radio frequency allocation and transmission scheduling may be computationally intensive and may also increase signaling overhead resulting in non-efficient utilization of spectrum resources. Some wireless networks allow for user equipment to autonomously select resources V2V communications. In such networks, the resources for V2V communications may be selected either randomly or using a medium sensing operation, which may reduce some collision and co-channel interference problems. However, performance of random and medium sensing based resource selection mechanisms still significantly suffer from in-band emissions problems and these methods do not account for user equipment moving at relatively high speeds.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
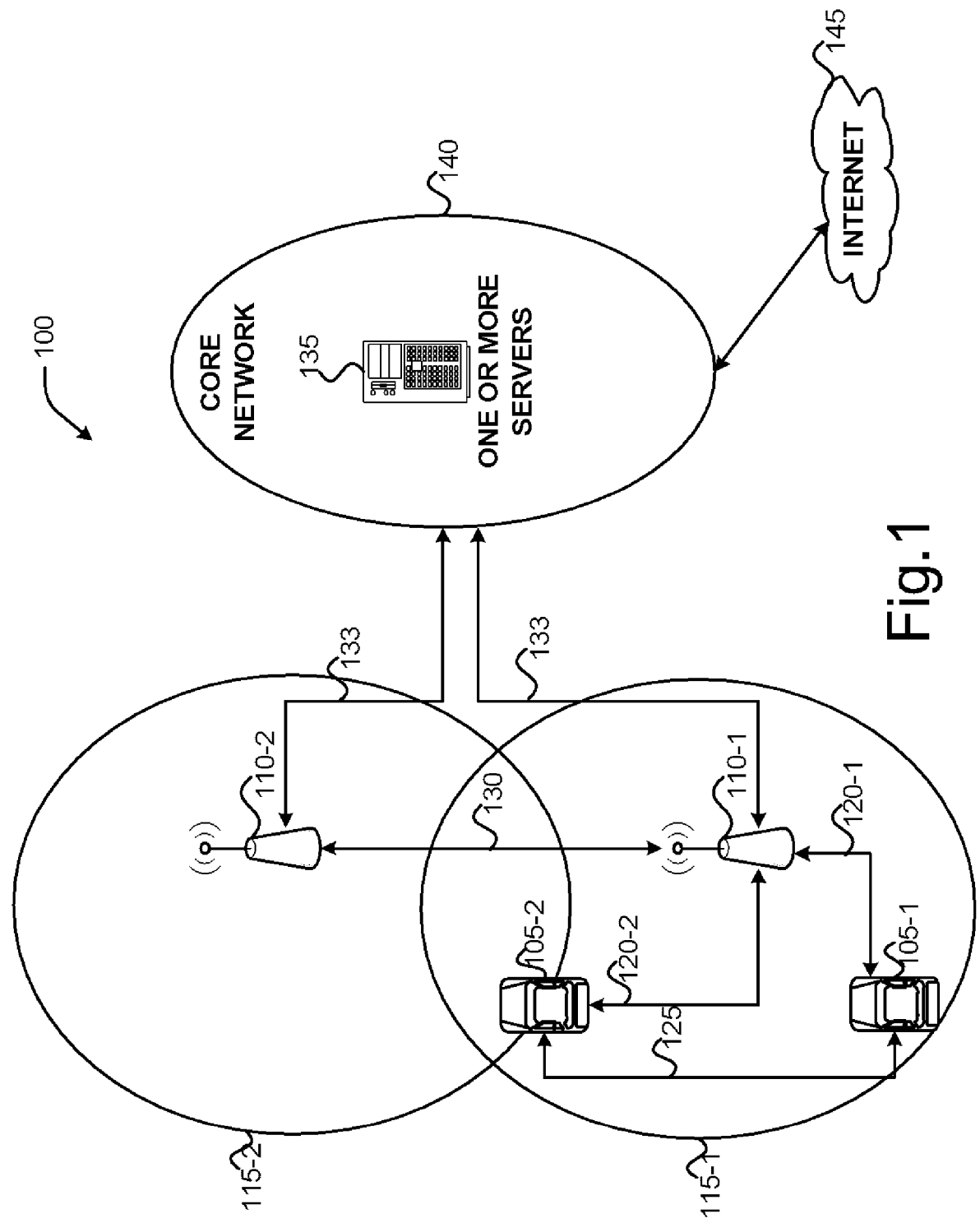
FIG. 1 illustrates a cellular communications network in accordance with various example embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute one or more software or firmware programs to provide at least some of the described functionality. Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "processor circuitry" or "central processing circuitry" refers to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" refers to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and the like).

As used herein, the term "user equipment" may be considered synonymous to, and may hereafter be occasionally referred to, as a V2V device, a vehicle-to-everything (V2X) device, client, mobile, mobile device, mobile terminal, user terminal, mobile unit, mobile station, mobile user, user equipment (UE), subscriber, user, remote station, access agent, user agent, receiver, etc., and may describe a remote user of network resources in a communications network. Furthermore, the term "user equipment" may include any type of wireless/wired device such as consumer electronics devices, onboard diagnostic (OBD) devices, dashtop mobile equipment (DME), mobile data terminals (MDTs), in-vehicle infotainment (IVI) devices, an in-car entertainment (ICE) devices, a wireless phones or smartphones, laptop personal computers (PCs), tablet PCs, wearable computer devices, machine type communication (MTC) devices, and/or any other physical device capable of recording, storing, and/or transferring digital data to/from other computer devices.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computer device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), base transceiver station (BTS), access point (AP), roadside unit (RSU), any new radio-interface technologies developed by 3GPP and/or other like organizations, etc., and may describe equipment that provides the radio baseband functions for data and/or voice connectivity between a network and one or more users. Furthermore, the term "RSU" may refer to any transportation infrastructure entity implemented in an eNB or a stationary (or relatively stationary) UE. An RSU implemented in a UE may be referred to as a "UE-type RSU" and an RSU implemented in an eNB may be referred to as an "eNB-type RSU."

It should also be noted that the term "channel" as used herein may refer to any transmission medium, either tangible or intangible, which is used to communicate data or a data stream. Additionally, the term "channel" may be synonymous with and/or equivalent to "communications channel," "data communications channel," "transmission channel," "data transmission channel," "access channel," "data access channel," "link," "data link," "sidelink," "carrier," "radiofrequency carrier," and/or any other like term denoting a pathway or medium through which data is communicated. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

Embodiments herein relate to mechanisms for autonomous selection of radio frequency (RF) resources (also referred to as "spectrum resources") for V2V sidelink transmissions. Example embodiments provide that geo-information, such as vehicle coordinates, speed, acceleration or other telematics and kinematic information, may be used for autonomous resource selection in order to maintain spatial isolation of transmissions from different vehicles in distributed manner. Example embodiments for autonomous resource selection may include synchronization and/or timestamp mechanisms, mechanisms for geolocation information acquisition, mechanisms to associate spectrum resources with geolocation information, mechanisms to facilitate the exchange of geolocation information, and resource selection processes and/or procedures. Other embodiments may be described and/or claimed.

FIG. 1 illustrates an example of a cellular communications network 100 (also referred to as "network 100"), according to various example embodiments. Network 100 includes two UEs 105 (UE 105-1 and UE 105-2 are collectively referred to as "UE 105" or "UEs 105"), two eNBs 110 (eNB 110-1 and eNB 110-2 are collectively referred to as "eNB 110" or "eNBs 110"), two cells 115 (cell 115-1 and cell 115-2 are collectively referred to as "cell 115" or "cells 115"), and one or more servers 135 in a core network (CN) 140 that is connected to the internet 145. The following description is provided for an example network 100 that operates in conjunction with the Long Term Evolution (LTE) standard as provided by 3rd Generation Partnership Project (3GPP) technical specifications (TS). However, the example embodiments are not limited in this regard and the described embodiments may apply to other networks that may benefit from the principles described herein, such as 3GPP fifth generation (5G) networks, WiFi or Worldwide Interoperability for Microwave Access (WiMaX) networks, and the like. Furthermore, for illustrative purposes, the network 100 is shown and described as being deployed in a two dimensional (2D) freeway/highway/roadway environment wherein the UEs 105 are implemented in automobiles. However, the embodiments described herein are also applicable to three dimensional (3D) deployment scenarios where the UEs 105 are implemented in flying objects, such as aircraft, drones, unmanned aerial vehicles (UAVs), and the like.

Referring to FIG. 1, UEs 105 may be physical hardware devices capable of running one or more applications, capable of accessing network services via one or more radio links 120 (radio link 120-1 and radio link 120-2 are collectively referred to as "radio links 120" or "links 120") with a corresponding eNB 110, and capable of communicating with one another via sidelink 125. Links 120 may allow the UEs 105 to transmit and receive data from an eNB 110 that provides the link 120. Links 120 are described in more detail infra. The sidelink 125 may allow the UEs 105 to transmit and receive data from one another. The sidelink 125 between the UEs 105 may include one or more channels for transmitting information from UE 105-1 to UE 105-2 and vice versa and/or between UEs 105 and UE-type RSUs (not shown by FIG. 1) and vice versa. The channels may include the Physical Sidelink Broadcast Channel (PSBCH), Physical Sidelink Control Channel (PSCCH), Physical Sidelink Discovery Channel (PSDCH), Physical Sidelink Shared Channel (PSSCH), and/or any other like communications channels. The air interface between two or more UEs 105 and a UE 105 and a UE-type RSU (not shown by FIG. 1) may be referred to as a PC5 interface. To transmit/receive data to/from one or more eNBs 110 or UEs 105, the UEs 105 may include a transmitter/receiver (or alternatively, a transceiver), memory, one or more processors, and/or other like components that enable the UEs 105 to operate in accordance with one or more wireless communications protocols and/or one or more cellular communications protocols. The UEs 105 may have multiple antenna elements that enable the UEs 105 to maintain multiple links 120 and/or sidelinks 125 to transmit/receive data to/from multiple eNBs 110 and/or multiple UEs 105. For example, as shown in FIG. 1, UE 105 may connect with eNB 110-1 via link 120-1 and simultaneously connect with UE 105-2 via sidelink 125. An example deployment scenario where V2V messages may be exchanged between UEs 105 via sidelinks 125 is shown and described with regard to FIG. 2.

Figure 2:
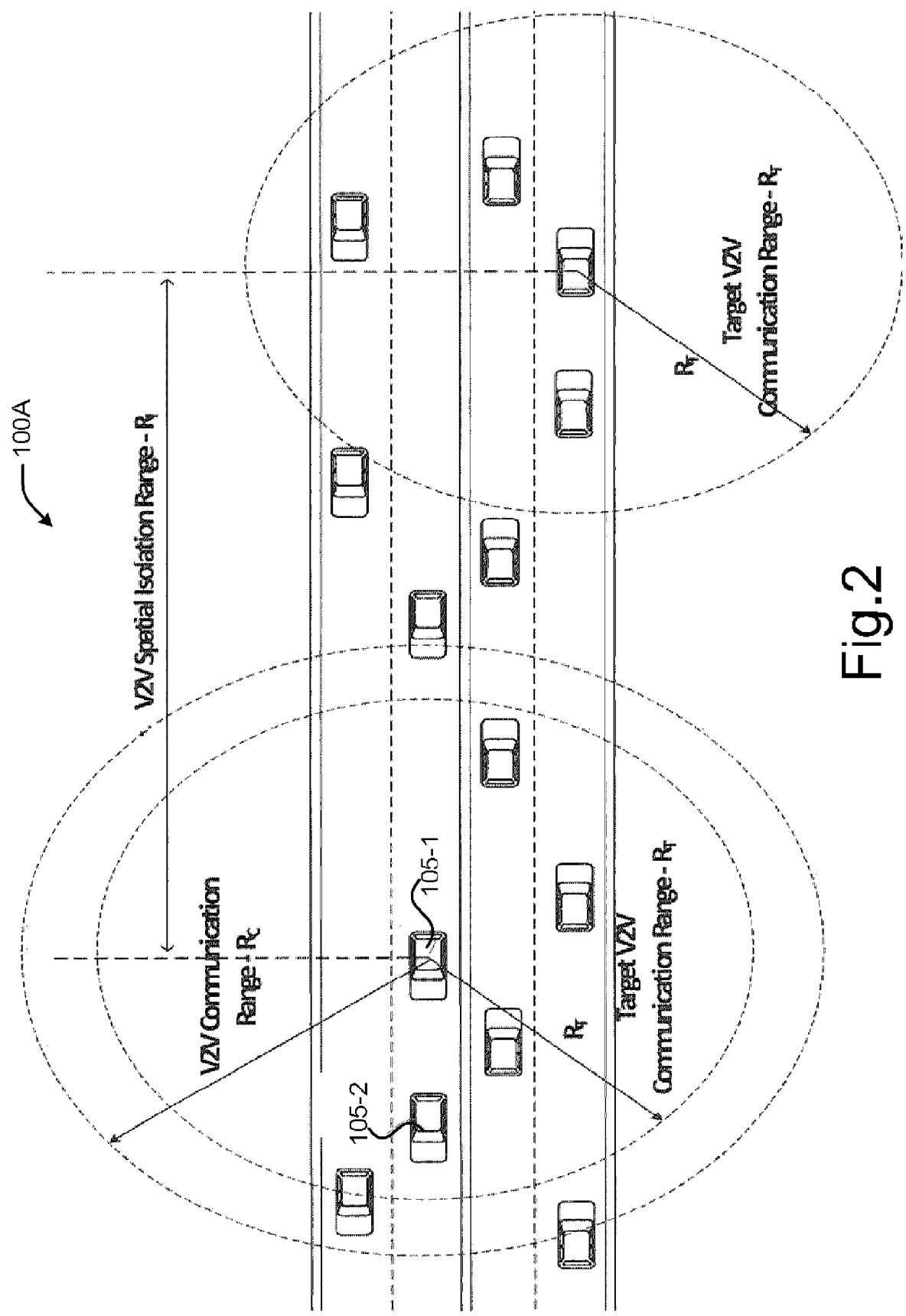
FIG. 2 illustrates an example deployment scenario wherein V2V messages may be exchanged between user equipment, in accordance with various example embodiments.

FIG. 2 illustrates an example deployment scenario 100A wherein V2V messages may be exchanged between UEs 105 via sidelinks 125, in accordance with various example embodiments. As shown by FIG. 2, V2V transmissions may be delivered to proximate UEs 105 within a target V2V communication range RT (also referred to as "target communication range RT" and the like). The target communication range RT may be smaller in comparison to an actual communication range RC. In embodiments, the size of the target communication range RT may be based on a distance at which a V2V message can be delivered due to channel propagation conditions, link budget, radio distance, and/or other like factors. Example embodiments provide spectrum resource selection procedures that allow a transmitting UE 105 to transmit V2V messages to receiving UEs 105 within the target communication range RT. The spectrum resource selection procedures of the example embodiments may help avoid half-duplex and co-channel interference. Co-channel interference may arise when two proximate UEs 105 select the same spectrum resource (for example, a same time-frequency channel) for transmission. Half-duplex problems may arise when a UE 105 cannot transmit and receive simultaneously or within the same time interval, and therefore, if several UEs 105 transmit at the same time instance they cannot hear each other thereby adversely affecting reliability of V2V transmissions if two UEs 105 are within target communication range RT of each other.

In order to maximize sharing of spectrum resources, as well as improve spectrum efficiency and V2V system capacity, example embodiments provide that spectrum resources may be reused by UEs 105 that are separated by a V2V spatial isolation range RI. For example a first UE 105 may be allowed to select the same spectrum resource that a second UE 105 has selected when the first UE 105 and the second UE 105 are separated by the V2V spatial isolation range RI. The V2V spatial isolation range RI is used to ensure that V2V messages from transmitting UEs 105 occupying the same spectrum resource are reliably delivered to target receiving UEs 105 within a corresponding target V2V communication range RT from the transmitting UEs 105.

One issue that may arise is that transmitting UEs 105 occupying the same spectrum resource may create mutual interference for receiving UEs 105. In addition, transmitting UEs 105 occupying the same spectrum resource may be out of communication range from each other, and thus, may not be able to detect collision on selected spectrum resources and/or estimate impact from collisions on reliability of message delivery to target receiving UEs 105 within their own communication range. In general, from a system perspective it may be desirable to increase target communication range RT such that it has a similar size as the communication range RC to reduce the likelihood of impacts from inter-UE interference. Another problem in V2V communication is the near-far or in-band emission problem. This problem may exist due to non-power controlled transmission toward a particular receiving UE 105 due to the broadcast nature of V2V operation. Therefore, even if two distant transmitting UEs 105 have selected an orthogonal frequency resource at the same time (or within a same transmission time interval), the receiving UEs 105 that are located close to a particular transmitting UE 105 may not be able to successfully receive a V2V message from a distant transmitting UE 105 due to near-far and in-band emission effects. The resource selection procedures of the example embodiments may resolve the previously mentioned problems.

Referring back to FIG. 1, UEs 105 may be capable of collecting and/or determining geo-information, such as a geolocation, GNSS coordinates, or GPS coordinates or by tracking vehicle kinematic systems. In order to estimate its own geo-information, a UE 105 may utilize its GNSS circuitry and/or GPS circuitry, as well as location applications. In addition, the UEs 105 may determine their geo-information using network based positioning techniques and/or information from an internal onboard kinematic system including meters or sensors (for example, speedometers, accelerometers, altimeters, and/or other like sensors). Furthermore, the UEs 105 may be capable of measuring various cell-related criteria, such as channel conditions and signal quality (for example, reception-transmission time difference measurements, Received Signal Strength Indicator (RSSI) measurements, channel occupancy measurements, RSRP/RSRQ measurements, Signal-to-Noise Ratio (SNR) measurements, Signal-to-Interference-plus-Noise Ratio (SINR) measurements, and the like), which may be signaled to an eNB 110 in a measurement report.

In various embodiments, the UEs 105 may provide a report including collected geo-information (also referred to as a "geo-information report" or "geo-information update") to one or more other UEs 105. The UEs 105 may use their own geo-information and geo-information exchanged among the UEs 105 to select spectrum resources for V2V communications. In some embodiments, the UEs 105 may provide a geo-information report to one or more eNBs 110, which may be used by the eNB 110 for scheduling and/or spectrum allocation purposes. The UEs 105 may collect and report geo-information to other UEs 105 and/or eNBs 110 based on instructions or a geo-information configuration received from an eNB 110. In embodiments, the geo-information configuration may indicate criteria and/or parameters for reporting geo-information to other UEs 105 and/or eNBs 110, such as a report type that may indicate a coordinate system and/or message type of a geo-information report, a geo-information reporting type that may indicate whether geo-information reporting is periodic or based on an event and/or trigger, timestamp information that may indicate how and when to collect a timestamp for obtained geo-information (for example, explicit, implicit, or synchronous), trigger information that may indicate an event or condition for transmitting a geo-information report, a spectrum allocation, scheduling information, and the like. To these ends, UEs 105 may be capable of receiving radio frequency signals from the eNBs 110, decoding these signals to obtain messages from the eNBs 110, generating and encoding messages (for example, geo-information reports), and signaling such messages to the eNBs 110.

As mentioned previously, UEs 105 may be capable of autonomously selecting RF spectrum resources for transmitting and receiving V2V communications. To autonomously select RF spectrum resources, each UE 105 may be capable of synchronizing itself with a synchronization source, which may be indicated to the UEs 105 in a geo-information configuration. The synchronization source may provide a timing reference, which may be used to organize V2V communications (in time and frequency) across the network 100 or a portion of the network 100. Synchronizing the V2V communications across the network 100 or a portion of the network 100 may be used for enhanced resource allocation mechanisms based on partitioning overall spectrum resources on time-frequency sub-channels common across UEs 105 that can be selected for transmission to reduce co-channel interference, collisions, and in-band emissions issues. The synchronization source may be the network 100 or one or more external (or global) synchronization sources. For example, the UEs 105 may use a GNSS as a synchronization source in deployment scenarios where global synchronization is desired, or the UEs 105 may use a network time (or timing) as a synchronization source in deployment scenarios where network-based synchronization is desired. In some embodiments, UEs 105 may use GNSS as a primary synchronization source, and the UEs 105 may use the network time as a secondary or fallback synchronization source that is used when GNSS is unavailable. In other embodiments, each UE 105 may use a UE component or embedded device as a synchronization source. For example, the UEs 105 may include a relatively stable atomic clock, which can be used to derive an absolute timing for synchronization. In another example, the UEs 105 may derive an absolute timing for synchronization from a crystal oscillator of the GNSS or GPS circuitry. The atomic clock or crystal oscillator may be used as a primary or secondary synchronization source. Furthermore, the geo-information configuration may list of available synchronization sources and an associated priority (for example, using the GNSS as a synchronization source being a first or highest priority, using the network time as a synchronization source being a second or next highest priority, using an embedded device as a third or lowest priority, and the like).

Furthermore, each UE 105 may be capable of determining an association of spectrum resources designated for V2V communications with a reference time of a synchronization source, one or more geographic reference points (GRPs), and/or one or more reference spectrum resource points (RRPs). In this way, the UEs 105 may determine RF spectrum resources for V2V communications at any particular time instance at any particular geo-location. Processes and/or schemes for associating spectrum resources with synchronization sources, GRPs, and/or RRPs are shown and described with regard to FIGS. 4-7. Each UE 105 may also implement a spectrum resource selection procedure using its own geo-information, geo-information of neighboring UEs 105, and the synchronization information to select appropriate RF spectrum resources for the V2V communications. Example spectrum resource selection procedures or process are shown and described with regard to FIGS. 8-9.

Referring back to FIG. 1, eNBs 110 may be hardware computer devices configured to provide wireless communication services to mobile devices (for example, UEs 105) within a coverage area or cell 115 associated with an eNB 110 (for example, cell 115-1 associated with eNB 110-1 and cell 115-2 associated with eNB 115-2). eNBs 110 may also be referred to as eNB-type RSUs. A cell 115 providing services to UEs 105 (or UE-type RSUs) may also be referred to as a "serving cell," "cell coverage area," and the like. Each eNB 110 may be part of a radio access network (RAN) or associated with a radio access technology (RAT). For example, the eNBs 110 may be associated with an evolved universal terrestrial radio access network (E-UTRAN) when employing LTE standards, or the eNBs 110 may be eMBB devices that are associated with a New Radio access technology (NR) (also referred to as "Next Generation Access Technologies") of a fifth generation (5G) network. As discussed previously, eNBs 110 may provide wireless communication services to UE 105 via links 120. The links 120 between the eNBs 110 (or eNB-type RSUs) and the UEs 105 (or UE-type RSUs) may include one or more downlink (or forward) channels for transmitting information from eNB 110 (or eNB-type RSUs) to UE 105 (or UE-type RSUs). Links 120 may also include one or more uplink (or reverse) channels for transmitting information from UEs 105 (or UE-type RSUs) to an eNBs 110 (or eNB-type RSUs). The channels may include the physical downlink shared channel (PDSCH), physical downlink control channel (PDCCH), physical hybrid automatic repeat request (HARD) indicator channel (PHICH), physical control format indicator channel (PCFICH), physical broadcast channel (PBCH), physical multicast channel (PMCH), physical uplink shared channel (PUSCH), physical uplink control channel (PUCCH), physical random access channel (PRACH), and/or any other like communications channels. The air interface between a UE 105 (or a UE-type RSU) and an eNB 110 (or an eNB-type RSU) may be referred to as an LTE-Uu interface.

The eNBs 110 may include a transmitter/receiver (or alternatively, a transceiver) connected to one or more antennas, one or more memory devices, one or more processors, and/or other like components. The one or more transmitters/receivers may be configured to transmit/receive data signals to/from one or more UEs 105 within its cell 115 via one or more links that may be associated with a transmitter and a receiver. In embodiments where network 100 employs LTE or LTE-A standards, eNBs 110 may employ Evolved Universal Terrestrial Radio Access (E-UTRA) protocols, for example, using orthogonal frequency-division multiple access (OFDMA) for scheduling and transmitting downlink communications and single carrier frequency-division multiple access (SC-FDMA) for scheduling and receiving uplink communications from UEs 105. Furthermore, eNBs 110 may be capable of communicating with one another over a backhaul connection 130 and may communicate with the one or more servers 135 within a core network (CN) 140 over another backhaul connection 133. The backhaul connection 130 may include a wired connection employing an X2 application protocol (AP) interface, which defines an interface for communicating data packets directly between eNBs 110. The backhaul connection 133 may include a wired connection employing an S1-AP interface, which defines a protocol for the forwarding of packets to one or more mobility management entities (MMEs), one or more Serving Gateways (SGWs), and/or other like CN elements and protocols introduced to support V2X specific services and intelligent transportation system applications.

Each eNB 110 may allocate spectrum resources and/or schedule V2V sidelink transmissions (also referred to as "V2V communications") over the PC5 air interface. In such embodiments, the eNBs 110 may schedule the V2V communications for the UEs 105 according to a semi-persistent scheduling (SPS) algorithm, and may provide scheduling information to the UEs 105. In embodiments, the scheduling information may include a resource allocation that associates a spectrum resource grid with geo-information or geographic sub-regions (GSRs). The UEs 105 may use the scheduling information and obtained geo-information to select one or more RF spectrum resources (for example, time-orthogonal or time-frequency orthogonal spectrum resources) on which to transmit or receive V2V communications within a target communication range RT while preserving a spatial isolation range RI. In addition depending on the radio-interface technology in use, the UE physical layer transmission parameters can be associated with geo-location information (for example, demodulated reference signal (DMRS) sequence, spreading codes, transmission power, and the like) In various embodiments, the eNBs 110 may instruct UEs 105 how and when to determine or obtain their geo-information, how and when to report the geo-information to the eNB 110 and/or other UEs 105, and how and when to timestamp the obtained geo-information. These instructions may be referred to as a "geo-information reporting configuration," "geo-information updating configuration," "geo-information configuration," and the like. Such geo-information configurations may also include GRP configurations instructing the UEs 105 how and when to signal V2V communications using relative vehicle geo-information, and/or RRP configurations indicating how RRPs are associated with GRPs, which may also indicate how and when to signal V2V communications. Alternatively, in other embodiments this information may be at least partially provided by application layers to the UE.

CN 140 may include one or more hardware devices such as the one or more servers 135. These servers may provide various telecommunications services to the UEs 105. In embodiments where network 100 employs the LTE standards, the one or more servers 135 of the CN 140 may comprise components of the System Architecture Evolution (SAE) with an Evolved Packet Core (EPC) as described by 3GPP TSs. In such embodiments, the one or more servers 135 of the CN 140 may include components such as one or more MMES and/or one or more Serving General Packet Radio Service Support Nodes (SGSN) (each of which may be referred to as an "SGSN/MME"), one or more serving gateways (SGW), one or more packet data network (PDN) gateways (PGW), one or more home subscriber servers (HSS), one or more access network discovery and selection functions (ANDSF), one or more evolved packet data gateways (ePDGs), one or more MTC interworking functions (IWF), one or more ProSe functions, one or more SLPs, and/or other like components as are known. In embodiments, the CN 140 may include one or more dedicated core networks (DCNs), where each DCN includes one or more of the aforementioned CN elements that are dedicated to serve specific type(s) of subscriber or traffic. The various CN elements of the CN 140 may route phone calls from UE 105 to other mobile phones or landline phones, or provide the UE 105 with a connection to the internet 145 for communication with one or more applications servers and/or other computer devices. Because the components of the SAE core network and their functionality are generally well-known, a further detailed description of the SAE core network is omitted. It should also be noted that the aforementioned functions may be provided by the same physical hardware device or by separate components and/or devices.

Although FIG. 1 shows two cell coverage areas (for example, cells 115), two base stations (for example, eNBs 110), and two mobile devices (for example, UEs 105), it should be noted that in various example embodiments, network 100 may include many more eNBs serving many more UEs than those shown in FIG. 1. However, it is not necessary that all of these generally conventional components be shown in order to understand the example embodiments as described herein.

Figure 3:
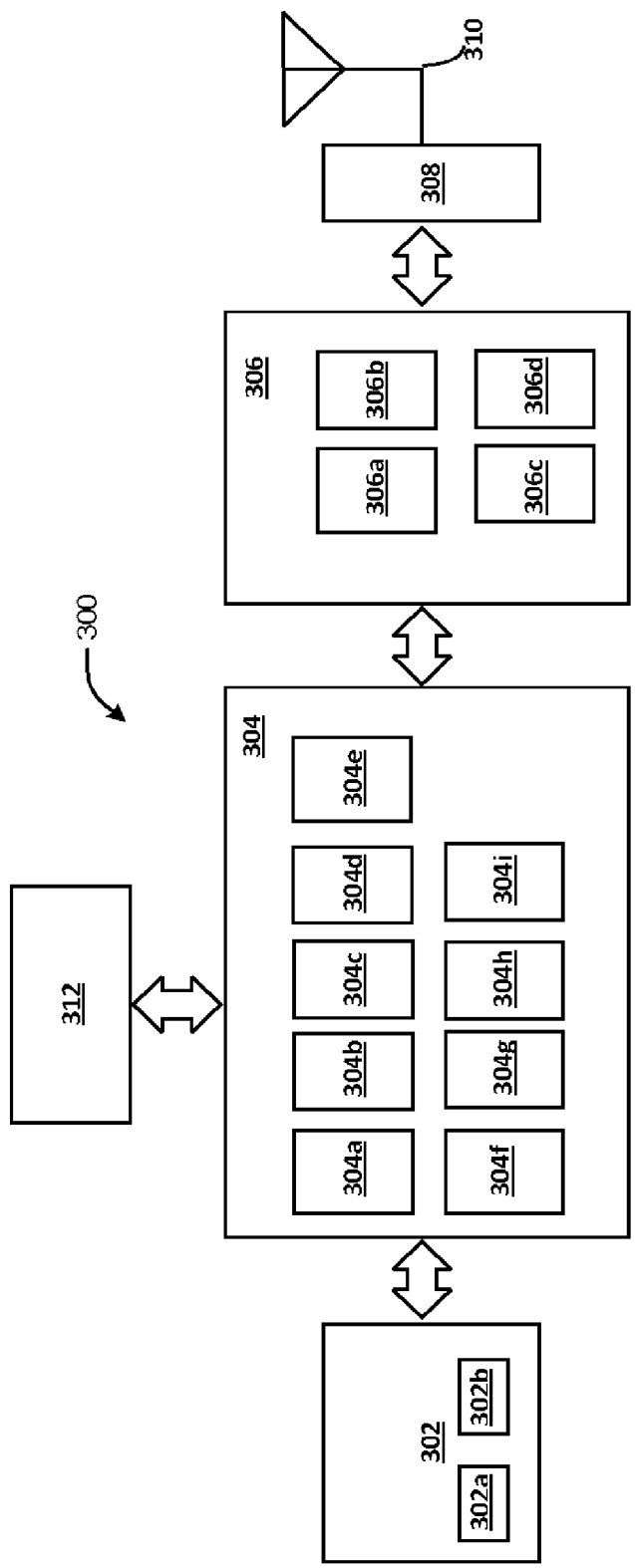
FIG. 3 illustrates example components of an electronic device for wireless communication, in accordance with various example embodiments.

FIG. 3 illustrates, for one embodiment, example components of an electronic device 300. In various embodiments, the electronic device 300 may implemented in or by UE 105 and/or an eNB 110 as described previously with regard to FIG. 1. In some embodiments, the electronic device 300 may include application circuitry 302, baseband circuitry 304, radio frequency (RF) circuitry 306, front-end module (FEM) circuitry 308 and one or more antennas 310, coupled together at least as shown. In embodiments where the electronic device 300 is implemented in or by an eNB 110, the electronic device 300 may also include network interface circuitry (not shown) for communicating over a wired interface (for example, an X2 interface, an S1 interface, and the like).

The application circuitry 302 may include one or more application processors. For example, the application circuitry 302 may include circuitry such as, but not limited to, one or more single-core or multi-core processors 302a. The processor(s) 302a may include any combination of general-purpose processors and dedicated processors (e.g., graphics processors, application processors, etc.). The processors 302a may be coupled with and/or may include computer-readable media 302b (also referred to as "CRM 302b", "memory 302b", "storage 302b", or "memory/storage 302b") and may be configured to execute instructions stored in the CRM 302b to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuitry 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (for example, 5G, 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding circuitry 304h and decoding circuitry 304i of the baseband circuitry 304 may include convolution, tail-biting convolution, turbo, Viterbi, and/or Low Density Parity Check (LDPC), polar encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A CPU 304e (also referred to as "central processing circuitry") of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may include elements for compression/decompression and echo cancellation and may include other suitable processing elements in other embodiments. The baseband circuitry 304 may further include computer-readable media 304g (also referred to as "CRM 304g", "memory 304g", "storage 304g", or "CRM 304g"). The CRM 304g may be used to load and store data and/or instructions for operations performed by the processors of the baseband circuitry 104. CRM 304g for one embodiment may include any combination of suitable volatile memory and/or non-volatile memory. The CRM 304g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 304g may be shared among the various processors or dedicated to particular processors. Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SoC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path that may include circuitry to down-convert RF signals received from the FEM circuitry 308 and provide baseband signals to the baseband circuitry 304. RF circuitry 306 may also include a transmit signal path that may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect. In some embodiments, the synthesizer circuitry 306d may be a fractional-N synthesizer or a fractional N/N+1 synthesizer, although the scope of the embodiments is not limited in this respect, as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path that may include circuitry configured to operate on RF signals received from one or more antennas 310, amplify the received signals and provide the amplified versions of the received signals to the RF circuitry 306 for further processing. FEM circuitry 308 may also include a transmit signal path that may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry 308 may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In embodiments where the electronic device is implemented in or by an eNB 110, the electronic device 300 may include network interface circuitry 312. The network interface circuitry 312 may be one or more computer hardware components that connect electronic device 300 to one or more network elements, such as one or more servers within a core network or one or more other eNBs via a wired connection. To this end, the network interface circuitry 312 may support one or more data link layer standards, such as X2 application protocol (AP), S1 AP, Stream Control Transmission Protocol (SCTP), Ethernet, Point-to-Point (PPP), Fiber Distributed Data Interface (FDDI), and/or any other suitable data link layer protocol. Furthermore, the network interface circuitry 312 may include, or may be associated with processing circuitry, including one or more dedicated processors, logic circuits, field programmable gate arrays (FPGAs), and the like, to provide processing techniques suitable to carry out communications according to the one or more data link layer standards used by the network interface circuitry 312.

In some embodiments, the electronic device 300 may include additional elements such as, for example, a display, a camera, one or more sensors, input/output (I/O) interfaces, and/or buses (not shown). Furthermore, in various embodiments, the various components/elements depicted by FIG. 3 may be rearranged, broken into additional components, combined, and/or omitted altogether.

In embodiments where the electronic device 300 is an eNB 110 or is incorporated into or otherwise part of an eNB 110, processor circuitry of the eNB 110 (for example, one or more processors 302a or one or more processors 304a-e) may be to identify a geographic region including a plurality of GSRs, wherein each GSR of the plurality of GSRs is associated with a GRP of a plurality of GRPs and a RRP of a plurality of RRPs. The processor circuitry of the eNB 110 may also be to allocate RF spectrum resources to each GSR of the plurality of GSRs for one or more V2V sidelink transmissions. Encoding circuitry of the eNB 110 (for example, encoding circuitry 304h) may be to encode a message for transmission to a UE 105. The message may indicate the allocation of RF spectrum resources to each GSR including an association of GRPs and RRPs to each GSR. The allocation may be for selection of a set of the RF spectrum resources for the one or more V2V sidelink transmissions by the UE based on a position of the UE relative to positions of the plurality of GRPs and positions of the plurality of RRPs.

In some embodiments where the electronic device 300 is implemented in an eNB 110, CRM 302b may store program code, which when executed by the processors 302a of the application circuitry 302, may cause the eNB 110 to allocate spectrum resources, configure UEs 105 for geo-information exchange, and/or perform any other method/procedure/process described herein. In other embodiments where the electronic device 300 is implemented in an eNB 110, CRM 304g may store program code, which when executed by one or more processors 304a-e of the baseband circuitry 304, may cause the eNB 110 to allocate spectrum resources, configure UEs 105 for geo-information exchange, and/or perform any other method/procedure/process described herein. Furthermore, the components of the electronic device 300 may be configured to perform the processes described herein, such as processes 1000 described with respect to FIG. 10.

In embodiments where the electronic device 300 is a UE 105 or is incorporated into or otherwise part of a UE 105, decoding circuitry of the UE 105 (for example, decoding circuitry 304i) may be to decode a message to obtain an allocation of RF spectrum resources to each of a plurality of GSRs. The allocation may include an association a plurality of GRPs and a plurality of RRPs to corresponding ones of the plurality of GSRs. Processor circuitry of the UE 105 (for example, one or more processors 304a-e) may be to select a set of the RF spectrum resources for one or more V2V sidelink transmissions based on a position of the UE relative to positions of the plurality of GRPs or positions of the plurality of RRPs. Furthermore, the components of the electronic device 300 may be configured to perform the processes described herein (or parts thereof), such as processes 800-900 described with respect to FIGS. 8-9.

Figure 4:
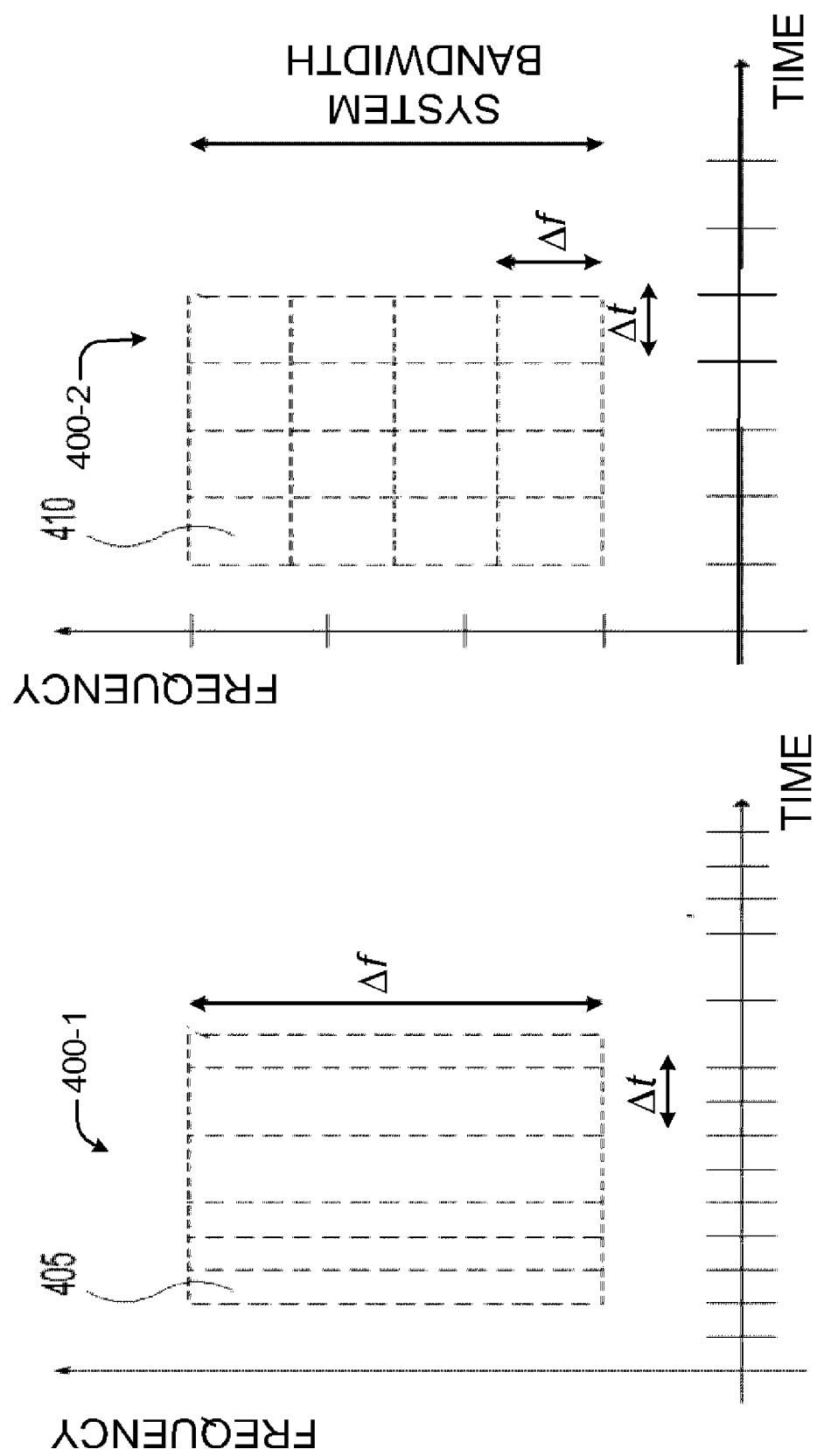
FIG. 4 illustrates example V2V resource allocation schemes, in accordance with various example embodiments.

FIG. 4 illustrates example V2V resource allocation schemes, in accordance with various example embodiments. As shown, the example V2V resource allocation schemes may include a Time Division Multiplexing (TDM) sidelink resource allocation scheme 400-1 (also referred to as "scheme 400-1" or "spectrum resource grid 400-1") and a Frequency Division Multiplexing (FDM) and TDM sidelink resource allocation scheme 400-2 (also referred to as "scheme 400-2" or "spectrum resource grid 400-2") (collectively referred to as "schemes 400"). The schemes 400 may be used by the UEs 105 that are synchronized and have the same timing reference, such that their transmission timing and transmission intervals are aligned in time (also referred to as "time-slotted communication") and duration. As shown by FIG. 4, scheme 400-1 may include a plurality of time resources 405 (also referred to as "time sub-channels 405"), each of which having a width of a time granularity $\Delta t$ (for example, in milliseconds (ms)) and a length of a frequency granularity $\Delta f$. In the scheme 400-1, the frequency granularity $\Delta f$ may be equal to a system bandwidth, which may be the amount of spectrum resources allocated for V2V sidelink transmissions or a subset thereof. Each time resource 405 may be assigned to an individual UE 105, and each UE 105 may transmit V2V transmissions using selected RF spectrum resources within the system bandwidth during a time instant within its assigned time granularity $\Delta t$. The scheme 400-1 may be used in deployment scenarios where very high data packet reliability is required (for example, where a reliability requirement of 1-10-5=99.999% is needed).

Scheme 400-2 may include a plurality of time-frequency resource 410 (also referred to as "time-frequency sub-channels 410"), each of which having a width of time granularity $\Delta t$ (for example, in ms) and a length of a frequency granularity $\Delta f$. In contrast to scheme 400-1, scheme 400-2 may have a frequency granularity $\Delta f$ that is equal to a predefined amount of spectrum resources. The predefined amount of spectrum resources of each frequency granularity M may include one or more subframes or one or more sub-carriers. Each of time-frequency resource(s) 410 may be assigned to an individual UE 105, and each UE 105 may transmit or receive V2V transmissions using selected RF spectrum resource(s) on a frequency resource(s) within its allocated frequency granularity $\Delta f$ during a time instant or time instances within its assigned time granularity $\Delta t$. In general, the scheme 400-2 may be used in deployment scenarios where reduction in co-channel interference is prioritized. In the examples shown by FIG. 4, the UEs 105 may have a common notion of time (for example, coordinated universal time (UTC) time or other reference timing) and subframe and/or slot boundaries that are aligned across all UEs 105 in time. This may provide relatively tight synchronization, which may be subject to synchronization errors within cyclic prefix duration (for example, in the order of microseconds or fractions thereof).

Figure 5:
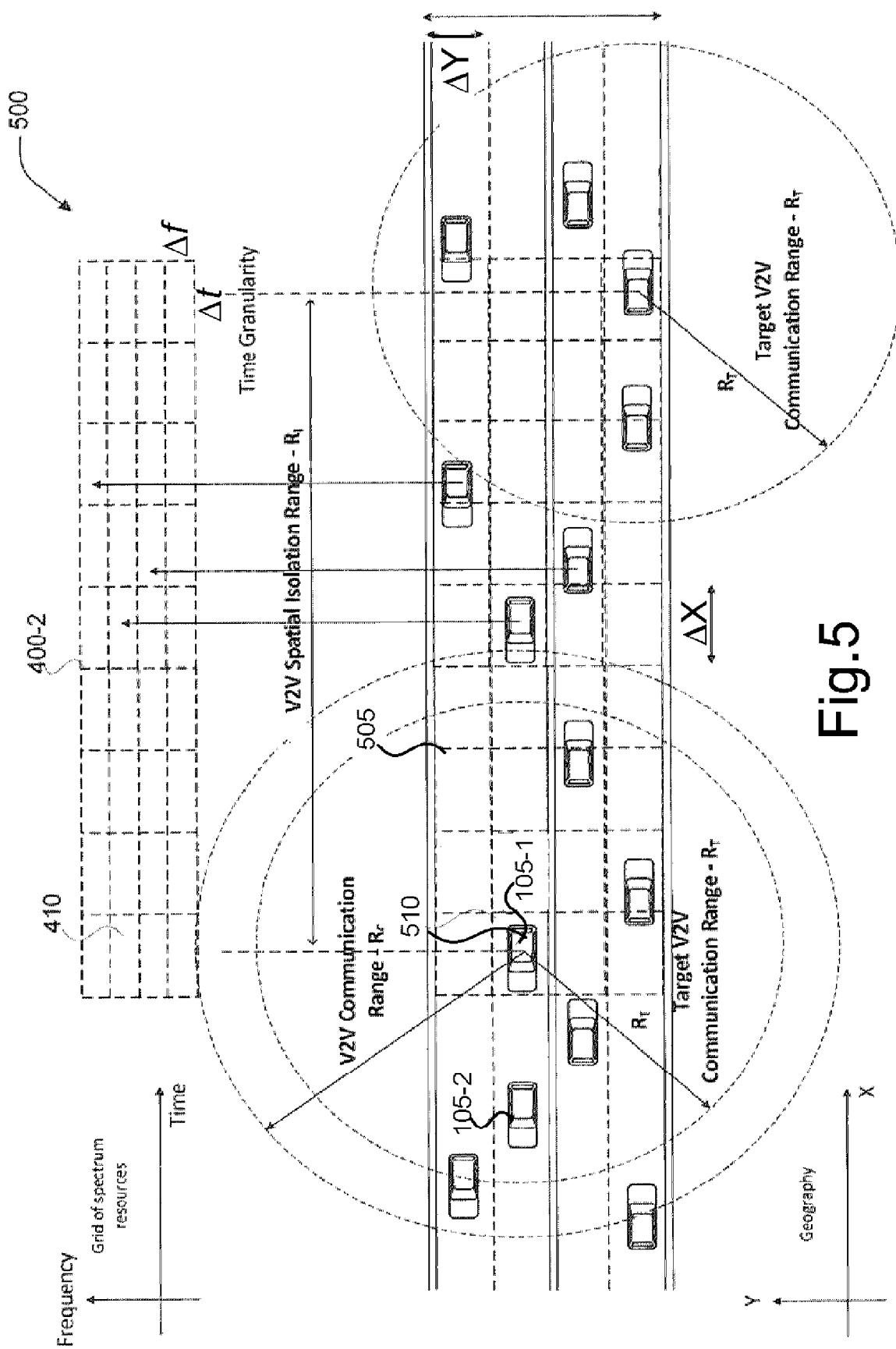
FIG. 5 illustrates an example resource allocation, in accordance with various example embodiments.

FIG. 5 illustrates an example resource allocation 500, in accordance with various example embodiments. The resource allocation 500 may also be referred to as a geo-based transmission schedule. In the example shown by FIG. 5, a roadway may be divided into geographic grid 505 including geographic sub-regions (GSRs) 510. In 2D geometric deployment scenarios, each GSR 510 may have a size of an $\Delta X$ granularity by a $\Delta Y$ granularity. In embodiments, the size and/or shape of the GSRs 510 may be determined by an associated eNB 110 or RSU. In such embodiments, the eNB 110 or RSU or V2X application layer may divide or partition an associated geographic region into the GSRs 510. In some embodiments, the size of each GSR 510 may be the same or similar to the average size of a vehicle (for example, one or several meters in length and/or width) or larger. The grid 505 may be mapped to the resource allocation scheme 400-2 (shown and described with regard to FIG. 4) such that each GSR 510 is mapped to a time-frequency spectrum resource 410 having a time granularity $\Delta t$ and a frequency granularity $\Delta f$ (also shown and described with regard to FIG. 4). Although FIG. 4 shows a one-to-one mapping, other types of mappings, such as one-to-many, many-to-one or many-to-many can be used in other embodiments. In some embodiments, spatial reuse may provide multiple spatially isolated geo-sub regions that can be mapped to the same spectrum resource(s). In this way, when a UE 105 (for example UE 105-1) would like to transmit a V2V message to another UE 105 (for example, UE 105-2), the UE 105 may determine its geolocation (for example, a GSR 510 in which UE 105-1 is located), select one or more associated spectrum resources (for example, a time-frequency sub-channel 410 associated with the GSR 510 in which the UE 105-1 is located), and the UE 105 may transmit the V2V message in the selected one or more resources.

This approach shown by FIG. 5 may require a relatively large amount of spectrum resources to assign many unique resources within the V2V spatial isolation range (for example, the geographic grid of ΔX and ΔY granularity). In some deployment scenarios, the amount of spectrum resources allocated for V2V communications may not be sufficient to ensure that GSRs 510 have a size that is the same or similar to the average vehicle size to ensure required spatial isolation range and ensure reliable communication at the V2V target communication range. Therefore, in other embodiments, the size of each GSR 510 may be as large as several vehicles, and each UE 105 in a same GSR 510 may select the same or similar spectrum resources for transmitting V2V messages. However, such embodiments may increase the likelihood of packet collisions, which may require more robust resource selection procedures.

As discussed previously, V2V applications typically require high reliability of packet delivery within the target communication range $R_T$ of a transmitting UE 105. The resource allocation 500 may provide unique resource assignments within a spatial isolation range $R_I$ to ensure packet delivery reliability. In various embodiments, the number of spectrum resources that are needed to enable unique resource assignments within the spatial isolation range $R_I$ may be determined using a reliability criteria equation. Furthermore, the reliability equation may be used by UEs 105 to autonomously select spectrum resources. An example reliability criteria equation is shown by equation 1 below.

$$(R_I \cdot W)/(\Delta X \cdot \Delta Y) \geq N_{FT} = N_F \cdot N_T \quad \text{[Equation 1]}$$

In equation 1, W is a road width, which may be measured or expressed as a number of lanes or lane widths; $R_I$ is the required spatial isolation range; $\Delta X \cdot \Delta Y$ is the size of a GSR 510 associated with a time-frequency resource 410; NFT is a total amount of time-frequency resources 410 within the spectrum resource grid 400-2 (for example, a total number of time-frequency sub-channels 410) associated with GSRs 510 having a size RI·W; NT is an amount of time resources (for example, a number of slots or subframes) within spectrum resource grid 400-2 associated with GSRs 510 having a size RI·W; and NF is an amount of frequency resources (for example, frequency sub-channels 410 or a number of frequency granularities Δf) within spectrum resource grid 400-2 associated with GSRs 510 having a size RI·W. In embodiments, where TDM resource grid 400-1 is used instead of grid 400-2, the variable NF may be equal to 1. In embodiments, RI·W may represent a square or rectangle of each GSR 510. Furthermore, in some embodiments, spatial isolation region RI may equal KX·ΔX and the road width W may equal KY·ΔY, where KX and KY are constant values.

In embodiments, the reliability criteria may be met if ΔX by ΔY is similar to average vehicle dimensions and the number of the GSRs 510 exceeds an amount of associated spectrum resources of granularity Δf by Δt. For example, in a TDM deployment where the average vehicle length is 5 meters and the spatial isolation range RI is 900 meters, then 180 time resources may be needed to meet the reliability criteria. Assuming that each time resource occupies 1 ms (for example, one transmission time interval (TTI) in LTE systems), a latency requirement of 100 ms may not be satisfied with such time granularity. Therefore, instead of using hard or permanent geo-resource partitioning, in various embodiments, the spectrum resources and/or GSR 510 sizes/shapes may be partitioned or determined dynamically based on traffic density (for example, a number of occupied GSRs 510, a number of UEs 105 occupying each GSR 510, and the like), load conditions (for example, a number of V2V transmissions being transmitted or being schedule for transmission), and/or other like criteria.

In addition, many V2V applications require relatively low latency for packet delivery within the target communication range RT of a transmitting UE 105. In some deployment scenarios, V2V applications may have very strict end-to-end latency constraints TL, for example 100 ms or less for road safety applications or less than 10 ms for some autonomous driving applications. Therefore, in various embodiments, the time granularity Δt and the number of time resources NT may be selected such that Δt·NT is less than the latency requirement TL to satisfy the latency requirements for various V2V applications.

Furthermore, some V2V applications may require a specific link budget or require a receiving UE 105 to be within a predetermined target communication range RT of a transmitting UE 105. Therefore, in various embodiments, there may be an additional boundary equation determining a link budget of transmission. In such embodiments, the energy per information bit should be above predetermined threshold or value. In other words, the ratio of energy (calculated as the product of time granularity of transmission resource on received power ΔtPRX) per information bit of the packet size L to noise power spectral density (NO) should exceed the signal-to-noise ratio (SNR) per information bit that is required to meet PER requirement for given packet size. A required link budget may be calculated using equation 2 below.

$$(\Delta t PRX/N0/L) > \text{SNR per information bit at target communication range } RT \quad \text{[Equation 2]}$$

The aforementioned conditions may be used to determine the required resource allocation parameters and evaluate feasibility to meet the reliability requirement at a target communication range or estimate the communication range under fixed physical settings, for example, transmit power, packet size, channel propagation conditions, and/or other like settings.

The described embodiments may also be applicable to three dimensional (3D) coordinate systems, which may be used by UEs 105 that are implemented by flying drones or UAVs. For example, the reliability criteria for spectrum resource allocation and/or selection in 3D coordinate systems may be represented by equation 2.

$$[f_i, t_i] = F(\{[X_k, Y_k, Z_k]\}, R_I, N_T, N_F, RX \text{ power}, \Delta X, \Delta Y, \Delta Z) \quad \text{[Equation 3]}$$

In equation 2, $f_i$ may be a frequency resource index; $t_1$ may be a time resource index $\{[X_k, Y_k, Z_k]\}$ may be a vector of coordinates in 3D space of multiple UEs 105; RI may be a spatial isolation range; ΔX, ΔY, ΔZ may be the size of the 3D GSRs associated with time-frequency resources; NT may be an amount of time resources (for example, a number of slots or subframes) within a 3D spectrum resource grid (e.g. time resource index, frequency resource index and code index or spatial beam index depending on the supported multiplexing types) associated with 3D GSRs having an area of ΔX×ΔY×ΔZ or having a radius of R; NF is an amount of frequency resources (for example, frequency sub-channels or a number of frequency granularities Δf) within the 3D spectrum resource grid associated with 3D GSRs having an area of ΔX×ΔY×ΔZ or having a radius of R; and RX power may represent a reception power level. In embodiments where a TDM resource allocation is used, the variable NF may be equal to 1. For 3D coordinate systems, the 3D GSRs may have any shape or size. For example, in some embodiments, ΔX×ΔY×ΔZ may represent a 3D GSR with a cube or box shape, while in other embodiments the 3D GSRs may be spheres each with a radius R. In embodiments where the 3D GSRs are spheres, the size of radius R may be based on the spatial isolation region RI, such that a sphere with a radius equal to the spatial isolation region RI may include a plurality of spherical GSRs with radius R.

Figure 6:
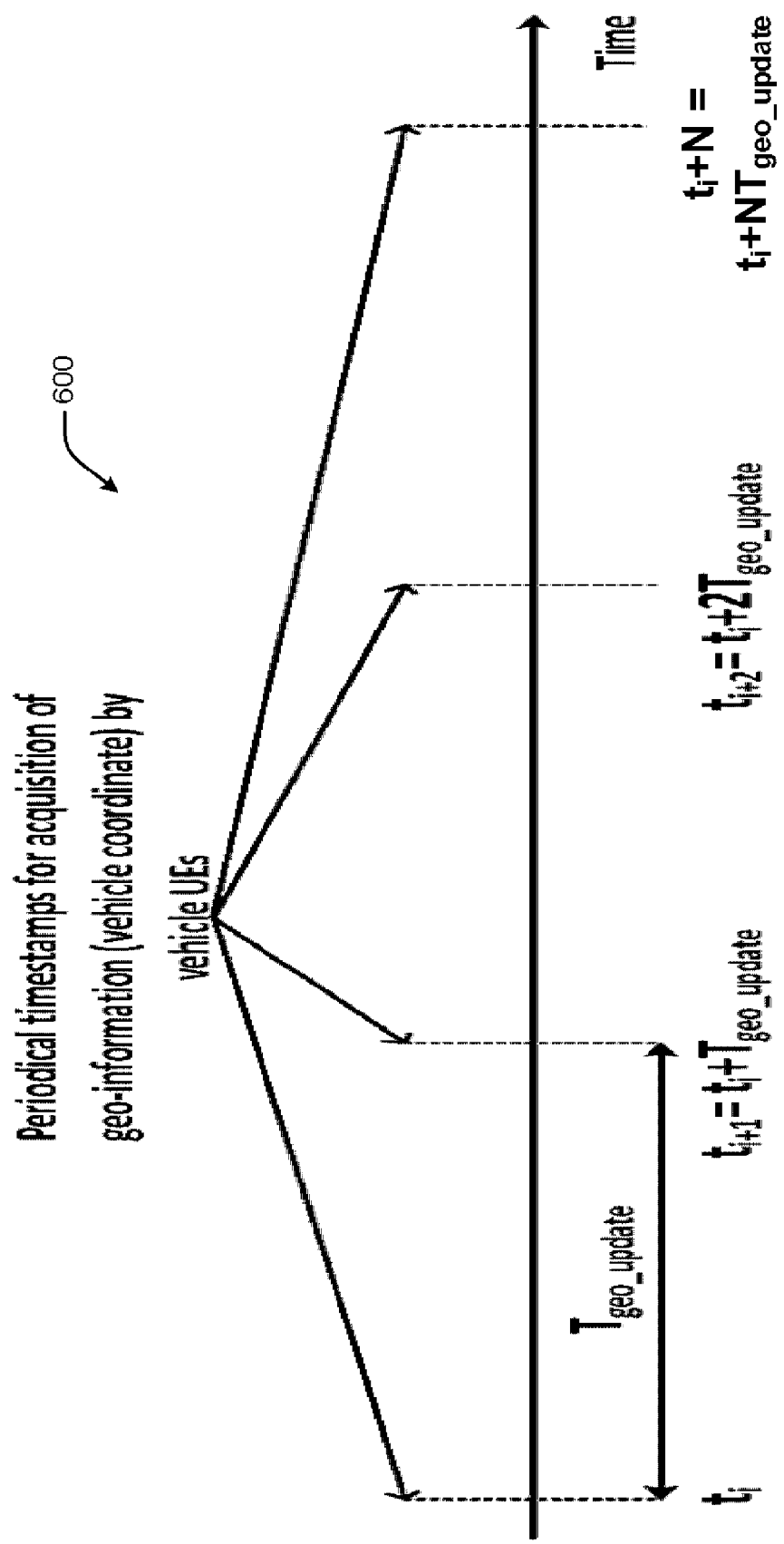
FIG. 6 illustrates a synchronous geo-information reporting scheme, in accordance with various example embodiments.

FIG. 6 illustrates a synchronous geo-information collection (acquisition) and reporting scheme 600, in accordance with various example embodiments. The synchronous geo-information collection (acquisition) and reporting scheme 600 may indicate time instances for collection and reporting acquired geo-information (for example, reporting geo-information to an eNB 110 or other UEs 105). The synchronous geo-information collection (acquisition) and reporting scheme 600 may be indicated to UEs 105 using a timestamp configuration.

In various embodiments, a timestamp configuration may instruct a UE 105 to collect and report geo-information periodically with predefined interval. In most embodiments, the collection (acquisition) of geo-information and reporting/sharing can be done at different time instances and the timestamp of collected geo-information may need to be reported and known. However, it is possible to reduce overhead related to timestamp of geo-information collection in synchronous communication protocols. In such embodiments, the UE 105 may report the latest available geo-information at each period or reporting time instance, and use the reporting time instance as the timestamp for geo-information collection (implicit timestamp of geo-information collection) with possibly some predetermined offset to accommodate geo-information collection and processing time. This type of timestamp may be referred to as a "synchronous timestamp." The synchronous timestamp may be based on a common reference timing of a synchronization source. In other embodiments, the time instances of collection and reporting geo-information may be different for each UE 105. In such embodiments, the timestamp may be a time at which the geo-information was acquired, collected, or obtained and the UEs 105 may explicitly signal the timestamp of collected geo-information. This may be referred to as an "explicit timestamp." As an alternative to explicit timestamping, a timestamp may be taken at a time instance when a geo-information update is to be signaled or at a time instance when generating the geo-information update. This may be referred to as an "implicit timestamp." The reporting of timestamp information may not be needed at all if the timestamp of geo-information collection is predetermined across UEs 105, so that a time-instance of geo-information collection is known to UEs (for example, when a common timestamp is used).

For example, in geo-information reporting scheme 600, UEs 105 may synchronously collect their corresponding geo-information at time instances ti, ti+1, ti+2, and ti+N (where N is a number). The time instances may be defined by or derived from a geo-information update periodicity Tgeo_update, which may be expressed in milliseconds (for example, 100 ms, 500 ms, 640 ms, 1000 ms, and the like). At each time instance ti, ti+1, ti+2, through ti+N, individual UEs 105 may determine their geo-information. The individual UEs 105 may then use the geo-information to select an appropriate spectrum resource for transmission. Further, in embodiments where the UEs 105 provide the geo-information reports to an eNB 110, the geo-information of each UE 105 may be used by an eNB 110 to reallocate spectrum resources to GSRs 510, re-partition a geographic region into GSRs 510 of different shapes or sizes, adjust the length or timing of the geo-information update period Tgeo_update, and/or make other service parameter adjustments.

Furthermore, the time stamp configuration may indicate the geo-information update period Tgeo_update and a start time from which to derive the geo-information update period Tgeo_update. Embodiments may include associating the geo-information update periods Tgeo_update with a system frame number or subframe number (SFN) and reporting time-instance. In some embodiments, the timestamps of collected geo-information may also be associated with a UTC time. As an example, a UE 105 may use equations 4 and/or 5 shown below to determine the time instance for geo-information updates.

$$\mathrm{mod}(\mathrm{SFN}, T_{geo\_update}) = \text{geo-update subframe(relative start time)} \quad [\text{Equation 4}]$$

$$\mathrm{mod}(\mathrm{UTC\ time}, T_{geo\_update}) \text{geo-update time instance (relative start time)} \quad [\text{Equation 5}]$$

In various embodiments, the timestamp configuration may be signaled by an eNB 110 using either radio resource control (RRC) signaling, medium access control (MAC) signaling, or system information block (SIB) signaling. In other embodiments, the timestamp configuration may be delivered to each UE 105 via a V2X application layer. The timestamp configuration may be included in or with a geo-information reporting configuration or may be provided to the UEs 105 separate from the geo-information reporting configuration. However, in other embodiments, UEs 105 may be preconfigured with timestamp requirements.

Figure 7:
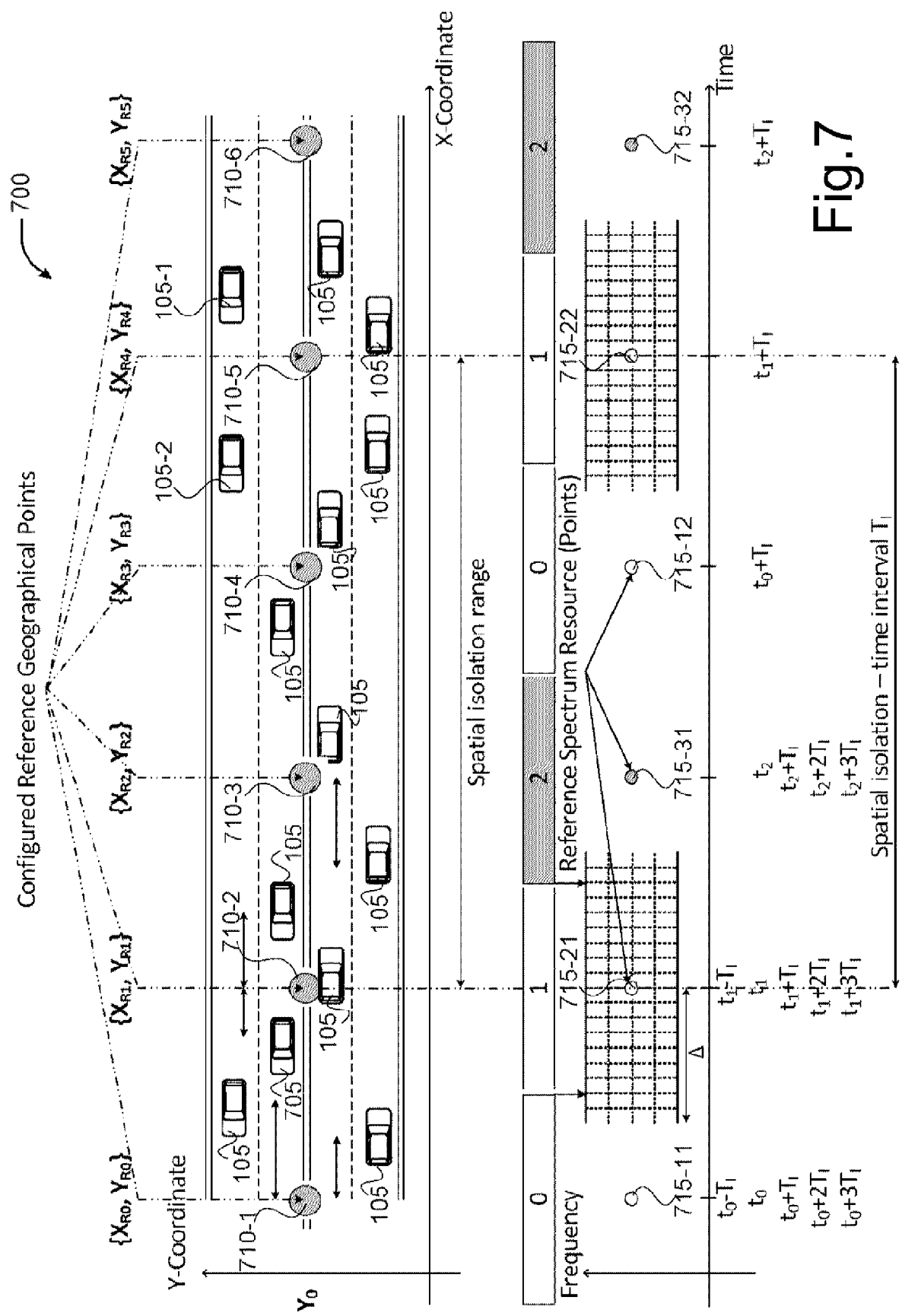
FIG. 7 illustrates another example resource allocation, in accordance with various example embodiments.

FIG. 7 illustrates another example resource allocation scheme 700, in accordance with various example embodiments. The resource allocation scheme 700 (also referred to as "scheme 700") may include GRPs 710-1 through 610-6 (collectively referred to as "GRPs 710" or "GRP 710") and RRPs 715-11 through 715-32 (collectively referred to as "RRPs 715" or "RRP 715").

The GRPs 710 may be used by the UEs 105 for calculation of relative geo-information. For example, the UE 105-1 may determine a distance between the UE 105-1 and GRP 710-5 and/or GRP 710-6, and use the distance from the GRP 710-5 and/or GRP 710-6 as the relative geo-information. In some embodiments, the UEs 105 may calculate its own geolocation using a determined distance between a UE 105 and a GRP 710 and the known location of the GRP 710. In other embodiments, the UEs 105 may simply determine a closest GRP 710 or a set of GRPs 710, and use the closest GRP 710 and/or set of GRPs 710 as the relative geo-information. In embodiments, the GRPs 710 may be collocated with geographic coordinates of eNBs 110 or RSUs, such as UE-type RSUs, eNB-type RSUs, or any other type of RSU infrastructure. In other embodiments, the GRPs 710 may be associated with some roadside object, such as mile markers, traffic signs, or any other like object. In some embodiments, one or more of the GRPs 710 may be virtual geographic points that are used by a UE 105 to determine its relative geolocation with respect to a physical GRP 710 (for example, with respect to the nearest physical object designated as a GRP 710). The relative geo-information or set of nearest GRPs 710 may be signaled to an eNB 110, a V2X/V2N application server or other suitable CN element, or may be exchanged between UEs 105 for autonomous spectrum resource selection as described herein.

In embodiments, RSUs or eNBs 110 may generate/configure a spectrum allocation by associating time and frequency resources with GRPs 710, and may provide the spectrum allocation to UEs 105 in or with a GRP configuration. The GRP configuration may also indicate the location of the GRPs 710. GRP configuration may be signaled to the UEs 105 by an eNB 110, an RSU, a V2X/V2N network server or some other suitable CN element of CN 140, or a V2X/V2N application or server outside of the CN 140. In embodiments where an eNB 110 provides the GRP configuration to the UE 105, MAC, RRC, or SIB signaling can be used to configure the GRPs 710. The format of geographic coordinates may be in the form of WGS-84 reference coordinate system or any other format describing global or local (relative) geographic coordinates. In embodiments where RSUs or eNBs 110 are collocated with the GRPs 710, then the GRP configuration may be signaled to the UEs 105 based on reported geo-information.

In addition (or alternatively) to providing a GRP configuration, in various embodiments, a UE 105 may also be provided with an RRP configuration, which may indicate time instances and frequency allocations associated with RRPs. The RRP configuration may be provided to the UEs 105 in a same or similar manner as the GRP configuration. In some embodiments, the GRP configuration and RRP configuration may be combined into a single configuration or message. In embodiments, RRPs 715 may be explicitly associated with a GRP 710. As shown by FIG. 7, Resource allocation scheme 600 shows an association of reference geographic points with reference spectrum resources represented by synchronous time intervals and frequency allocations. For example, as shown by FIG. 6, RRP 715-11 may be associated with GRP 710-1, RRP 715-21 may be associated with GRP 710-2, RRP 715-31 may be associated with GRP 710-3, RRP 715-12 may be associated with GRP 710-4, RRP 715-22 may be associated with GRP 710-5, and RRP 715-32 may be associated with GRP 710-6.

Furthermore, scheme 700 may also indicate associations between GRPs 710 and time-frequency spectrum resources. For example, GRP 710-1 with coordinates $\{XR0,YR0\}$ and GRP 710-4 with coordinates $\{XR3,YR3\}$ may be associated with a subset of time resources (time intervals): . . . , $\{t0-TI-\Delta, t0-TI+\Delta\}$; $\{t0-\Delta, t0+\Delta\}$; $\{t0+TI-\Delta, t0+TI+\Delta\}$, . . . . A subset of frequency resources associated with GRP 710-1 and GRP 710-4 may be a whole system bandwidth or may be any subset of frequency resources providing different capabilities and combinations of time-frequency spectrum resource reuse configurations.

GRP 710-2 with coordinates $\{XR1,YR1\}$ and GRP 710-5 with coordinates $\{XR4,YR4\}$ may be associated with subset of time resources (time intervals): . . . , $\{t1-TI-\Delta,t1-TI+\Delta\}$; $\{t1-\Delta, t1+\Delta\}$; $\{t1+TI-\Delta, t1+TI+\Delta\}$; . . . . A subset of frequency resources associated with GRP 710-2 and GRP 710-5 may be a whole system bandwidth or may be any subset of frequency resources providing different capabilities and combinations of time-frequency spectrum resource reuse configurations.

GRP 710-3 with coordinates $\{XR2,YR2\}$ and GRP 710-6 with coordinates $\{XR5,YR5\}$ may be associated with subset of time resources (time intervals): . . . , $\{t2-TI-\Delta,t2-TI+\Delta\}$; $\{t2-\Delta, t2+\Delta\}$; $\{t2+TI-\Delta, t2+TI+\Delta\}$; . . . . A subset of frequency resources associated with GRP 710-3 and GRP 710-6 may be a whole system bandwidth or may be any subset of frequency resources providing different capabilities and combinations of time-frequency spectrum resource reuse configurations.

Once the coordinates of GRPs 710, timestamps of geo-information updates, and association of GRPs 710 with spectrum resources are available, the UEs 105 may estimate relative position with respect to a nearest GRP 710 at each timestamp. This information, including the GRPs 710 may be signaled over the air between UEs 105 at designated resources allocated for geo-information exchange or jointly with any other information carrying V2X data. An example process for exchanging geo-information between UEs 105 is shown and described with regard to FIG. 8.

Figure 8:
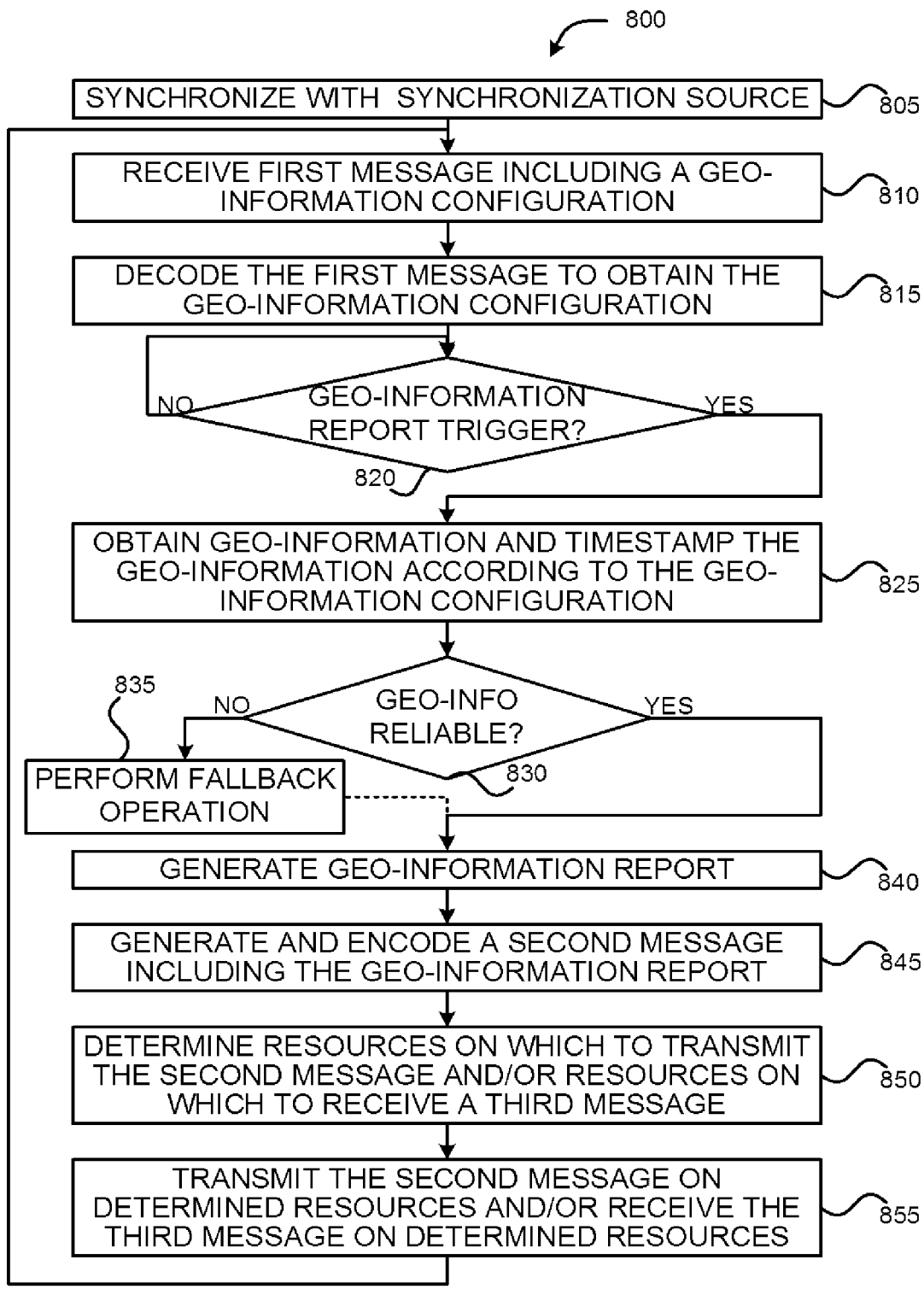
FIG. 8 illustrates a process for exchanging geo-information between user equipment, in accordance with various example embodiments.
Figure 9:
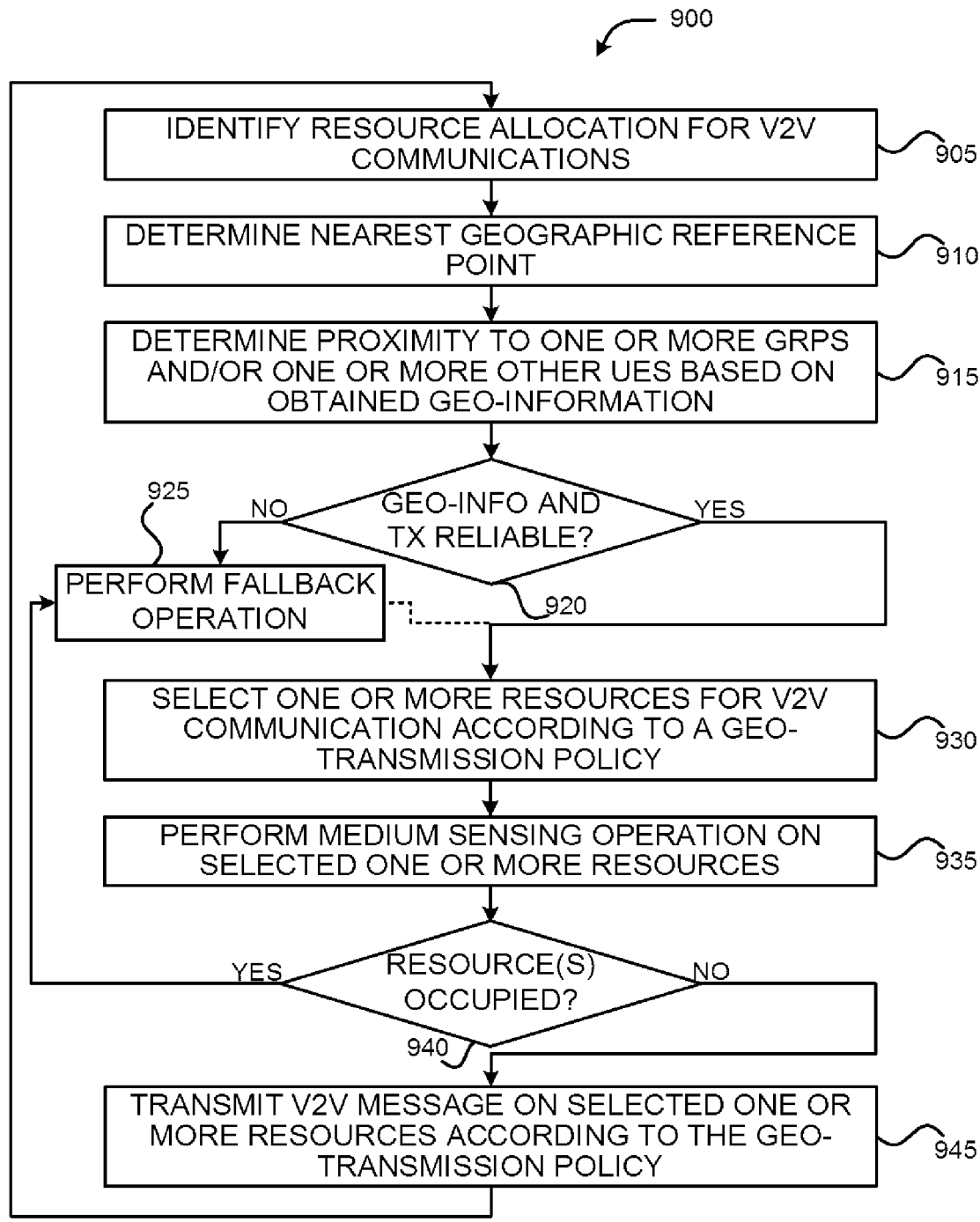
FIG. 9 illustrates the process for selecting spectrum resources for V2V communications, in accordance with various embodiments.

FIGS. 8-9 illustrate processes 800-900 for exchanging geo-information between UEs 105 and selection spectrum resources for exchanging geo-information, in accordance with various example embodiments. Processes 800-900 may be performed by a UE 105, which may include one or more computer-readable media (for example, CRM 304g shown and described with regard to FIG. 3) having instructions or program code, stored thereon, that when executed by one or more processors of the UE 105 (for example, one or more processors 304a-e, encoding circuitry 304h, and/or decoding circuitry 304i of the baseband circuitry 304 shown and described with regard to FIG. 3), causes the UE 105 to perform processes 800-900. For illustrative purposes, the operations of processes 800-900 are described as being performed by UE 105-1 or components of the UE 105-1 with elements of network 100, which are described with respect to FIGS. 1-7. However, it should be noted that other similar devices/entities/implementations may operate processes 800-900. While particular examples and orders of operations are illustrated in FIGS. 8-9, these operations may be re-ordered, broken into additional operations, combined, and/or omitted altogether. In some embodiments, the operations illustrated in FIGS. 8-9 may be combined with operations described with regard to other example embodiments and/or one or more operations described with regard to the non-limiting examples provided herein.

FIG. 8 illustrates a process 800 for exchanging geo-information between UEs 105, in accordance with various example embodiments. Process 800 is described as being performed by a UE 105-1 to provide a geo-information report to another UE 105. However, in various embodiments, process 800 may be performed by a UE 105 to signal/share other V2V messages over the air with another UE 105.

At operation 805, the central processing circuitry of the UE 105-1 may synchronize with a synchronization source. In embodiments, the geo-information configuration may indicate the synchronization source to be used for synchronization (for example, a global synchronization source, network-based synchronization source, or local/embedded synchronization source). In such embodiments, the central processing circuitry of the UE 105-1 may identify and use a reference time of the synchronization source to obtain and/or timestamp geo-information. Furthermore, the central processing circuitry of the UE 105-1 may determine time instances for collecting and reporting geo-information (also referred to as "reporting time instances") based on information contained in the geo-information configurations. The time instances may be based on a geo-update time instance or periodicity, such as a geo-information update period Tgeo_update as discussed previously.

At operation 810, interface circuitry of the UE 105-1 may control receipt of a first message including a geo-information configuration. The first message may be signaled to the UE 105-1 using RRC, MAC, or SIB signaling as discussed previously. At operation 815, decoding circuitry of the UE 105-1 may decode the first message to obtain the geo-information configuration. The geo-information configuration may include the reporting or timestamp configuration, GRP configuration, RRP configuration, spectrum resource allocation, scheduling information, and/or any other configurations discussed herein. In some embodiments, each of the aforementioned configurations may be combined into a single configuration or set of instructions.

At operation 820, the central processing circuitry of the UE 105-1 may determine whether a geo-information reporting trigger has occurred. In embodiments, the reporting trigger may be based on expiration of a timer, the occurrence of one or more events, and/or other conditions or criteria. If at operation 820 the central processing circuitry of the UE 105-1 determines that a geo-information reporting trigger has not occurred, the central processing circuitry of the UE 105-1 may loop back to operation 820 to monitor for a geo-information reporting time instance. If at operation 820 the central processing circuitry of the UE 105-1 determines that a reporting time instance has occurred, the central processing circuitry of the UE 105-1 may proceed to operation 825 to obtain the geo-information and/or timestamp the geo-information according to the geo-information configuration.

At operation 825, the central processing circuitry of the UE 105-1 may obtain geo-information of the UE 105-1 and timestamp the obtained geo-information according to the geo-information configurations. For example, the central processing circuitry of the UE 105-1 may obtain absolute coordinates or relative coordinates of the UE 105-1's position. The relative coordinates may be a position of the UE 105-1 with respect to one or more GRPs 710, or the relative coordinate may be represented by an identifier (ID) or geo-ID of a GRP 710 closest to the UE 105-1. The reporting time instance of the UE 105-1 may also serve as a timestamp for geo-information acquisition.

At operation 830, the central processing circuitry of the UE 105-1 may determine whether the obtained geo-information is reliable. This determination may be based on environmental or channel conditions when the geo-information is collected. However, the information or data used to determine whether the geo-information is reliable may be implementation specific. If at operation 830 the central processing circuitry of the UE 105-1 determines that the obtained geo-information is unreliable, the central processing circuitry of the UE 105-1 may proceed to operation 835 to perform a fallback operation. In some embodiments, the fallback operation may include determining and reporting geo-information that is derived from the coordinates of proximate UEs 105. In other embodiments, the UE 105-1 may perform a medium sensing operation or perform a random selection procedure to select spectrum resources for communication V2V messages. In embodiments where the fallback operation includes performing a medium sensing operation or performing a random selection procedure, process 800 may end once an unoccupied channel is selected. In embodiments where the fallback operation includes deriving geo-information based on proximity to other UEs 105, the central processing circuitry of the UE 105-1 may proceed to operation 840 (represented by the dashed line in FIG. 8) to generate a geo-information report that includes the derived geo-information. Referring back to operation 830, if at operation 830 the central processing circuitry of the UE 105-1 determines that the obtained geo-information is reliable, the central processing circuitry of the UE 105-1 may proceed to operation 840 to generate a geo-information report.

At operation 840, the central processing circuitry of the UE 105-1 may generate a geo-information report that includes the obtained geo-information, and in some embodiments, the timestamp. The content of the geo-information report may include the absolute coordinates or the relative coordinates. In some embodiments, the relative coordinates and the geo-ID of a closest GRP 710 may be included in the report. Alternatively, the report may only include the coordinates or geo-ID of the closest GRP 710. In some embodiments, the report may include other information relevant for V2V communications, such as telematics or vehicle kinematic information, (for example, one or more data or states produced by different vehicle sensors), the timestamp of the collected information, reference timing information of the UE, and the like.

At operation 845, the central processing circuitry of the UE 105-1 may generate a second message that includes the geo-information report, and the encoding circuitry of the UE 105-1 may encode the second message for transmission to one or more other UEs (for example, UE 105-2) or an eNB 110 (for example, eNB 110-1). When the second message is to be transmitted to one or more other UEs, the second message may be V2V message. When the second message is to be transmitted to an eNB, the second message may be a layer 3 (L3), layer 2 (L2), or layer 1 (L1) message. L3 reporting may include using common or dedicated RRC signaling to carry an RRC message over the PUSCH. L2 reporting may include using a media access control (MAC) control element (CE) carried by the PUSCH. L1 reporting may include using a reporting mechanism that is used for channel state information (CSI), channel quality indicator (CQI), rank indicator (RI), pre-coding matrix indicator (PMI), and the like. In embodiments where L1 reporting is used, the geo-information report may be signaled to an eNB 110 via link 120 using the PUCCH, PUSCH, or a power controlled transmission to the eNB 110 over PSDCH, PSCCH, and/or PSSCH.

At operation 850, the central processing circuitry of the UE 105-1 may determine or select one or more resources on which to transmit the second message and/or determine or select one or more resources on which to receive a third message. The third message may include a geo-information report associated with another UE 105, which may have been obtained by the eNB 110-1 from the other UE 105. In embodiments, the central processing circuitry of the UE 105-1 may determine the resources for transmitting the second message or receiving the third message based on the allocation and/or scheduling information indicated by the geo-information configuration, which may be applicable for signaling the geo-information report to/from another UE 105 via sidelink 125 or signaling the geo-information report to/from an eNB 110 via link 120. The determination of the resources for transmitting the second message or receiving the third message may also be based on a current position of the UE 105-1, a speed or velocity of the UE 105-1, and/or other like criteria.

At operation 855, the central processing circuitry or interface circuitry of the UE 105-1 may control the RF circuitry 306 to transmit the second message to the other UE 105 over sidelink 125 or to eNB 110-1 over link 120. In addition (or alternatively), at operation 855 the central processing circuitry or interface circuitry of the UE 105-1 may control the RF circuitry 306 to receive a third message from the other UEs 105 over sidelink 125 or from eNB 110-1 over link 120. In embodiments, the interface circuitry (or the central processing circuitry) may operate in a "UE-autonomous mode" or an "eNB-controlled mode." In the UE-autonomous mode, the interface circuitry may control transmission of the second message to one or more other UEs 105 and control receipt of the third message from one or more other UEs 105. In the eNB-controlled mode, the interface circuitry may control transmission of the second message to the eNB 110-1 and control receipt of the third message from the eNB 110-1.

In the UE-autonomous mode, the second message and/or the third message may be broadcasted over the PC5 air-interface using different physical channels, such as the PSCCH, the PSSCH, or the PSDCH. In the eNB-controlled mode, the second message may be transmitted using L1, L2, or L3 signaling as discussed previously. Further, in the eNB-controlled mode, the third message may be received using L1, L2, or L3 signaling, which may include a physical layer, MAC, RRC, or SIB messages carried by the PDSCH, PDCCH, or PMCH.

In embodiments, the second message and/or the third message may be reported to an eNB 110 so that the eNB 110 can assign or schedule spectrum resources for the V2V communications and/or allocate/schedule spectrum resources (for example, time intervals) for geolocation information exchange among the UEs 105. In other embodiments, the second message and/or the third message may be reported to an eNB 110 so that the eNB 110 may provide the reported geo-information to the UEs 105 in its serving cell. For example, eNB 110-1 may receive the second message including a geo-information report from UE 105-1 at operation 855, and then forward the report to UE 105-2, or provide UE 105-1's geo-information to UE 105-2 in a different type of message. In another example, eNB 110-1 may receive the third message including a geo-information report from UE 105-2, and then forward the third message to UE 105-1 at operation 855, or provide UE 105-2's geo-information to UE 105-1 in a different type of message. After completion of operation 845, process 800 may repeat as necessary or end.

FIG. 9 illustrates the process 900 for selecting spectrum resources for V2V communications, in accordance with various embodiments. Process 900 is described as being performed by a UE 105-1 to autonomously select resources to use for V2V communication during a next resource selection period once geo-information has been exchanged between UEs 105. In some embodiments, process 900 may be performed by a UE 105 to signal/share its geolocation information over the air with another UE 105.

Referring to FIG. 9, at operation 905, the central processing circuitry of the UE 105-1 may identify a resource allocation for V2V communications. The resource allocation may be the same or similar to the resource allocation schemes described with regard to FIGS. 4-7. At operation 910, the central processing circuitry of the UE 105-1 may determine a nearest GRP 710 by for example, determining a distance between its own position and a known coordinates of GRPs 710 in a vicinity of the UE 105-1.

At operation 915, the central processing circuitry of the UE 105-1 may determine a proximity of the UE 105-1 to one or more GRPs 715 and/or one or more other UEs 105 based on the obtained geo-information. In embodiments, the central processing circuitry of the UE 105-1 may calculate the proximity using its own geolocation coordinates with the coordinates indicated by a geo-information report received from one or more other UEs 105. In some embodiments, the central processing circuitry of the UE 105-1 may calculate the distance for each proximate UE 105 to the nearest GRP 710. In addition, the central processing circuitry of the UE 105-1 may generate a list of proximate UEs 105 and sort the list according to proximity, for example, by listing proximate UEs 105 in order according to their distance from the UE 105-1 or their position with respect to nearest or selected GRP(s) 710. This list may be used for resource selection at operation 930.

In some embodiments, the central processing circuitry of the UE 105-1 may utilize signaling information to determine the proximity of other UEs 105, determine a number of UEs 105, and traffic demands in an area surrounding the UE 105-1. For example, in some embodiments, the central processing circuitry of the UE 105-1 may perform an RSSI calculation of one or more signals broadcasted by the other UEs 105 and determine a position of the UE 105-1 relative to the other UEs 105 based on the strength of such signals. The central processing circuitry of the UE 105-1 may determine a position of the UE 105-1 relative to the other UEs 105 by way of triangulation. One method of triangulation may include performing an RSSI calculation of one or more signals broadcast/generated by a first other UE 105 and another RSSI calculation of one or more signals generated by another device, such as an eNB 110, an RSU, or a second other UE 105. Such RSSI calculations may be calculated according to known methods. Additionally, instead of, or in addition to using the RSSI, example embodiments may also utilize other information associated with the one or more signals, such as a path loss measurement, packet delay time, a signal to noise ratio, a measure of throughput, a jitter, latency, a round trip time (RTT), and/or other like parameters. Furthermore, any of the aforementioned triangulation methods may be combined to determine the position of the second vehicle 110. Furthermore, such triangulation methods may be combined with return timing information obtained by an IR capture device or other like sensors implemented by the UE 105-1, and/or combined with the geo-location information obtained by GNSS circuitry. In some embodiments, the central processing circuitry of the UE 105-1 may utilize previously obtained GNSS information shared over the air by one or more other UEs 105.

At operation 920, the central processing circuitry of the UE 105-1 may determine whether the obtained geo-information associated with the other UEs 105 and/or the transmitting (TX) UEs 105 are reliable. If at operation 920 the central processing circuitry of the UE 105-1 determines that the geo-information is unreliable, the central processing circuitry of the UE 105-1 may proceed to operation 925 to perform a fallback operation. In some embodiments, if non-reliable geo-information is detected for a subset of the one or more other UEs 105, the central processing circuitry of the UE 105-1 may continue to operate using geo-information based transmissions (for example, by performing operations 930-945), while communicating with the other UEs 105 with non-reliable geo-information in accordance with the fallback operation of operation 925. Operations 920 and 925 may be the same or similar to operations 830 and 835 discussed with regard to FIG. 8.

If at operation 920 the central processing circuitry of the UE 105-1 determines that the geo-information is reliable, the central processing circuitry of the UE 105-1 may proceed to operation 930 to select one or more resources for V2V communications according to a geo-transmission policy. In various embodiments, the central processing circuitry of the UE 105-1 may select spectrum resources based on a GSR 510 in which it is located in a same or similar manner as discussed with regard to FIG. 5. In various embodiments, the central processing circuitry of the UE 105-1 may select spectrum resources associated with nearest GRP 710 and/or associated RRP 715 in a same or similar manner as discussed with regard to FIG. 7. In addition, the selection of resources may be based on a geo-transmission policy, which may define rules, actions, and conditions under which resources are selected. The geo-transmission policy may be preconfigured at the UE 105-1 (for example, stored in a Universal Integrated Circuit Card (UICC) or embedded UICC of the UE 105-1) or it may be signaled to the UE 105-1 with the geo-information configuration. The specific rules, actions, and conditions of the geo-transmission policy may be set by network operators according to their policies and/or based on their infrastructure deployments. Furthermore, the central processing circuitry of the UE 105-1 may select spectrum resources based on the UE 105-1's proximity to the one or more other UEs 105 and/or with respect to UE 105-1's relative position with respect to the one or more GRP 710. For example, using the list generated at operation 915, the central processing circuitry of the UE 105-1 may select spectrum resources having time-frequency sub-channels 410 that are less likely to be selected by UEs 105 that are relatively close to the UE 105-1. Alternatively, the central processing circuitry of the UE 105-1 may select spectrum resources having time-frequency sub-channels 410 that are more similar to time-frequency sub-channels 410 selected by a relatively distant UE 105, such as spectrum resources separated by a spatial isolation range RI. Moreover, the central processing circuitry of the UE 105-1 may take into account spatial beamforming degrees, multiple input multiple output (MIMO) information when using multi-antenna and/or MIMO communications techniques, and/or code degrees when space or code division multiple access schemes are used jointly with time-frequency reuse.

At operation 935, the central processing circuitry of the UE 105-1 may control the RF circuitry 306 to perform a medium sensing operation on the selected one or more resources. In embodiments, the medium sensing operation may be performed across all allocated V2V communication resources for the GSR 510 in which the UE 105-1 is located, or a subset of resources allocated for the GSR 510 where UE 105-1 is located. Operation 935 may be used a contingency to ensure that the selected resources are not currently occupied by another V2V transmission due to, for example lack of spectrum resources, lack of reliable geo-information, or its misdetection of geo-information caused by current environmental conditions. At operation 940, the central processing circuitry of the UE 105-1 may determine whether the selected resources are occupied based on the medium sensing operation. If at operation 940 the central processing circuitry of the UE 105-1 determines that the selected resources are occupied, the central processing circuitry of the UE 105-1 may proceed to operation 925 to perform a fallback operation, such as performing a resource reselection procedure, performing another medium sensing operation to identify unoccupied resources, or selecting resources using a random selection procedure. If at operation 940 the central processing circuitry of the UE 105-1 determines that the selected resources are not occupied, the central processing circuitry of the UE 105-1 may proceed to operation 945 and to transmit a V2V message on the selected one or more resources according to the geo-transmission policy.

Figure 10:
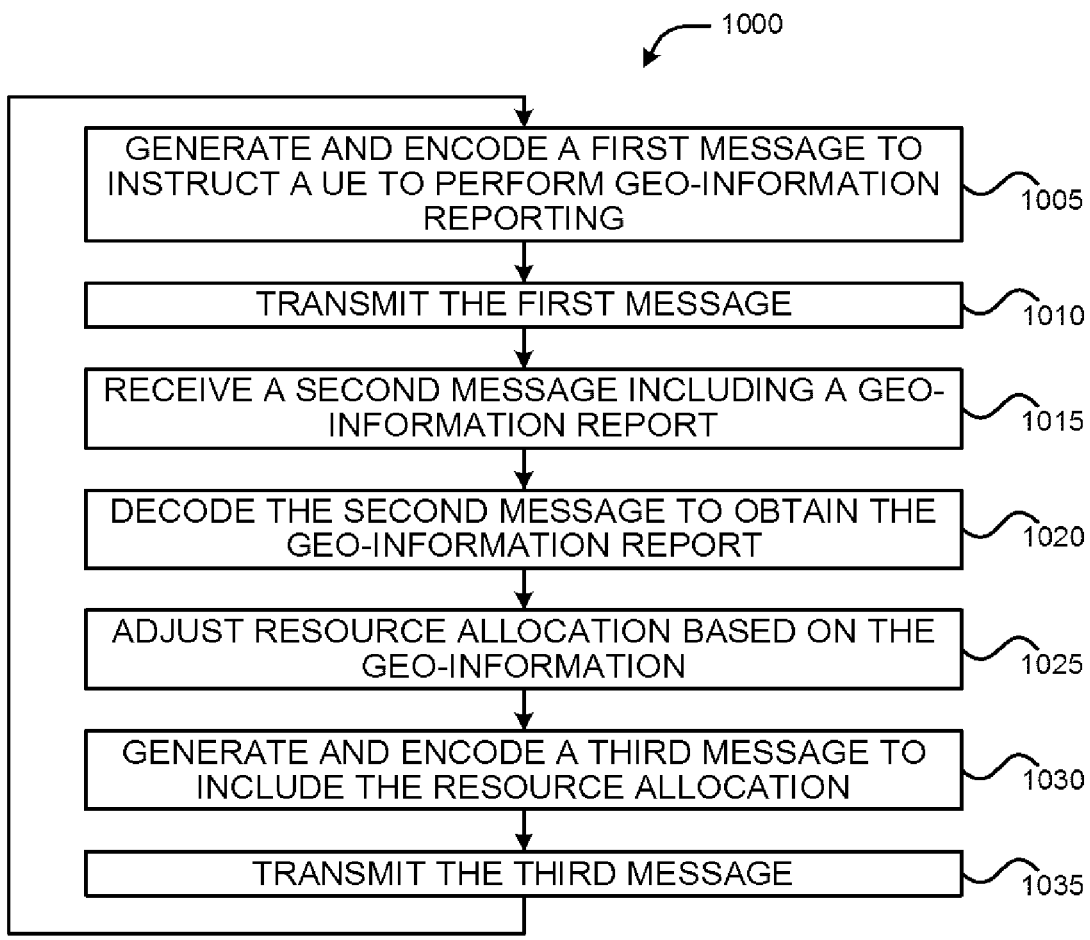
FIG. 10 illustrates the process for configuring user equipment to exchange geo-information, in accordance with various embodiments.

FIG. 10 illustrates the process 1000 for configuring a UE 105 for exchange of geo-information, in accordance with various embodiments. Process 1000 may be performed by an eNB 110, which may include one or more computer-readable media (for example, CRM 302*b* or CRM 304*g* shown and described with regard to FIG. 3) having instructions or program code, stored thereon, that when executed by one or more processors of the eNB 110 (for example, one or more processors 302*a* or one or more of processors 304*a-e*, encoding circuitry 304*h*, and/or decoding circuitry 304*i* shown and described with regard to FIG. 3), causes the eNB 110 to perform process 1000. For illustrative purposes, the operations of process 1000 are described as being performed by eNB 110-1 or components of the eNB 110-1 with elements of network 100, which are described with respect to FIGS. 1-7. However, it should be noted that other similar devices/entities/implementations may operate process 1000. While particular examples and orders of operations are illustrated in FIG. 10, these operations may be re-ordered, broken into additional operations, combined, and/or omitted altogether. In some embodiments, the operations illustrated in FIG. 10 may be combined with operations described with regard to other example embodiments and/or one or more operations described with regard to the non-limiting examples provided herein.

At operation 1005, the eNB 110-1 may generate and encode a first message to instruct a UE 105 to perform geo-information reporting. The first message may be a geo-information configuration as discussed previously. In embodiments, processor circuitry (or central processing circuitry) of the eNB 110-1 may generate the first message, and encoding circuitry of the eNB 110-1 may encode the first message for transmission to the UE 105-1. At operation 1010, the eNB 110-1 may transmit the first message to the UE 105-1. In embodiments, interface circuitry of the eNB 110-1 may provide data representative of the first message to the RF circuitry 306, and from the data representative of the first message, the RF circuitry 306 may generate signals for a transmit path. In other embodiments, at least some of the content of the geo-information configuration of the first message may be preconfigured at the UE 105-1 or provided to the UE 105-1 by an application layer (for example, from one or more CN elements).

At operation 1015, the eNB 110-1 may receive a second message including a geo-information report, and at operation 1020, the eNB 110-1 may decode the second message to obtain the geo-information report. In embodiments, the RF circuitry 306 may receive RF signaling from the UE 105-1, and the RF circuitry 306 may pass data representative of the signaling to decoding circuitry of the eNB 110-1 via the interface circuitry of the eNB 110-1. The decoding circuitry of the eNB 110-1 may decode the second message to obtain the geo-information report. The geo-information report may include geo-information (for example, an absolute coordinate or relative coordinate) and timestamp as discussed previously, and/or other vehicle telematics and kinematic information. The second message may be signaled to the eNB 110-1 using L1, L2, and/or L3 signaling.

At operation 1025, the eNB 110-1 may adjust a resource allocation for V2V communications based on the geo-information contained in the geo-information report. In embodiments, adjusting the resource allocation may include adjusting a size and/or shape of GSRs 510, adjusting a reporting periodicity, adjusting a location of GRPs 710 and/or RRPs 715, altering a number of resources associated with one or more GSRs 510, GRPs 710, and/or RRPs 715, changing the spectrum resources used for V2V transmissions, and the like. In embodiments, processor circuitry (or central processing circuitry) of the eNB 110-1 may also take into consideration other criteria when adjusting the resource allocation, such as loading information, a number of UEs 105 in the geographic region, traffic demands, and/or other like criteria.

At operation 1030, the eNB 110-1 may generate and encode a third message to include the resource allocation, and at operation 1035, the eNB 110-1 may transmit the third message to the UE 105-1. In embodiments, the third message may be provided to the UE 105-1 using physical layer signaling (for example, sidelink control information signaling), MAC, RRC or SIB signaling as discussed previously. The third message may be generated and encoded in a similar manner as discussed previously with regard to operation 1005, and the third message may be transmitted to the UE 105-1 in a same or similar manner as discussed above with regard to operation 1010. In some embodiments, the third message may also include a transmission interval during which the UE 105-1 may select and transmit V2V messages, while in other embodiments, such a transmission interval may be preconfigured at the UE 105-1. Furthermore, in some embodiments the third message may also include another geo-information configuration that is different than the geo-information configuration received with the first message. In some embodiments, the eNB 110-1 may also send the third message to one or more other eNBs 110 (e.g., eNB 110-2) or one or more RSUs for inter-cell interference coordination (ICIC) purposes, network-wide V2V coordination, or other like purposes. After completion of operation 1045, process 1000 may end or repeat as necessary.

Figure 11:
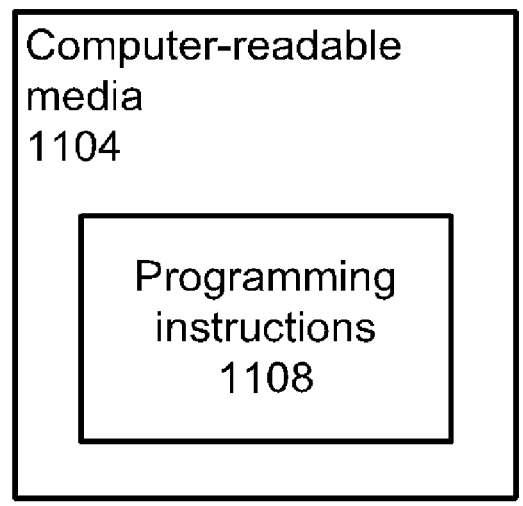
FIG. 11 illustrates an example computer-readable media, in accordance with various example embodiments.

FIG. 11 illustrates an example computer-readable media 1104 that may be suitable for use to store instructions that cause an apparatus, in response to execution of the instructions by the apparatus, to practice selected aspects of the present disclosure. In some embodiments, the computer-readable media 1104 may be non-transitory. In some embodiments, computer-readable media 1104 may correspond to CRM 302*b*, CRM 304*g*, and/or any other computer-readable media discussed herein. As shown, computer-readable storage medium 1104 may include programming instructions 1108. Programming instructions 1108 may be configured to enable a device, for example, electronic device 300, a UE such as UEs 105, an eNB such as eNBs 110, or some other suitable device, in response to execution of the programming instructions 1108, to implement (aspects of) any of the methods or elements described throughout this disclosure related to geo-information reporting and/or V2V sidelink communications. In some embodiments, programming instructions 1108 may be disposed on computer-readable media 1104 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

Some non-limiting examples are provided below.

Example 1 may include an apparatus to be implemented in a user equipment ("UE") the apparatus comprising: decoding circuitry to decode a message to obtain an allocation of spectrum resources to each of a plurality of geographical sub-regions ("GSRs"); and central processing circuitry to select a set of the spectrum resources for one or more vehicle-to-vehicle ("V2V") sidelink transmissions based on a position of the UE relative to a GSR of the plurality of GSRs.

Example 2 may include the apparatus of example 1 and/or some other examples herein, wherein the message further includes a configuration, wherein the configuration is to indicate a geo-information reporting type and one or more synchronization sources from which to identify a reference time, wherein each of the one or more synchronization sources is associated with a priority, and wherein the central processing circuitry is to: determine the reference time via synchronization with a highest priority synchronization source of the one or more synchronization sources; determine individual time instances for collection and reporting of geo-information based on the geo-information reporting type, wherein the individual time instances are to indicate a time at which geo-information is to be collected with a corresponding timestamp; collect geo-information of the UE, wherein the position of the UE is based on the collected geo-information; and obtain a timestamp for the collected geo-information at each individual time instance according to the reference time.

Example 3 may include the apparatus of example 2 and/or some other examples herein, wherein the message is a first message, and the apparatus further comprises: encoding circuitry to encode a second message including the geo-information and the timestamp; and interface circuitry to operate in a UE-autonomous mode or an evolved nodeB (eNB)-controlled mode, wherein in the UE-autonomous mode, the interface circuitry is to: control transmission of the second message over a physical sidelink control channel ("PSCCH"), a physical sidelink shared channel ("PSSCH"), or physical sidelink discovery channel ("PSDCH") at each individual time instance according to the reference time, and control receipt of a third message over the PSCCH, the PSSCH, or the PSDCH, wherein the third message includes other geo-information associated with one or more other UEs that are within a target communication range of the UE; and wherein in the eNB-controlled mode, the interface circuitry is to: control transmission of the second message over a physical uplink shared channel ("PUSCH") or a physical uplink control channel ("PUCCH") at each individual time instance according to the reference time, and control receipt of the third message over a physical downlink shared channel ("PDSCH"), a physical downlink control channel ("PDCCH"), or a physical multicast channel ("PMCH").

Example 4 may include the apparatus of examples 1-3 and/or some other examples herein, wherein to select the set of the spectrum resources, the central processing circuitry is further to: determine, based on the other geo-information, a position of the one or more other UEs relative to the position of the UE; and select the set of the spectrum resources based on the position of the one or more other UEs with relative to the UE, wherein the set of spectrum resources are spectrum resources that conform with reliability criteria.

Example 5 may include the apparatus of example 4 and/or some other examples herein, wherein the allocation includes an association a plurality of geographical reference points ("GRPs") and a plurality of reference spectrum resource points ("RRPs") to corresponding ones of the plurality of GSRs, and wherein selection of the set of the spectrum resources is based on the position of the UE relative to positions of the plurality of GRPs or positions of the plurality of RRPs associated with GRPs.

Example 6 may include the apparatus of example 5 and/or some other examples herein, wherein to select the set of the spectrum resources, the central processing circuitry is further to: determine a position of one or more GRPs relative to the position of the UE or determine a position of the UE relative to the position of the one or more GRPs; and select the set of the spectrum resources based on a closest GRP of the one or more GRPs, wherein the closest GRP has a position closest to the position of the UE, and wherein the set of spectrum resources are spectrum resources of an RRP associated with the closest GRP.

Example 7 may include the apparatus of example 6 and/or some other examples herein, wherein the message further includes a configuration, wherein the configuration is to indicate a report type, a geo-information reporting type, timestamp information, and trigger information.

Example 8 may include the apparatus of example 7 and/or some other examples herein, wherein the central processing circuitry is to: determine the individual time instances for collection and reporting of geo-information to be a periodicity within a predefined interval when the geo-information reporting type indicates periodic reporting; or determine the individual time instances for collection and reporting of geo-information to be occurrences of a predetermined event or condition when the geo-information reporting type indicates trigger-based reporting, wherein the trigger information is to indicate the event or condition.

Example 9 may include the apparatus of example 8 and/or some other examples herein, wherein the central processing circuitry is to: obtain the timestamp upon collection of the geo-information when the timestamp information indicates to explicitly timestamp the geo-information; obtain the timestamp at a time of reporting collected geo-information when the timestamp information indicates to implicitly timestamp the geo-information; or obtain the timestamp at the individual time instances when the timestamp information indicates to synchronously timestamp the geo-information.

Example 10 may include the apparatus of example 9 and/or some other examples herein, wherein the central processing circuitry is to select the set of the spectrum resources based on one or more of a spatial isolation region; the position of the one or more other UEs relative to the position of the UE; a number of orthogonal time resources of the Spectrum resources; a number of orthogonal frequency resources of the Spectrum resources; a measured received power of each RF resource; or multiple input multiple output ("MIMO") beamforming information.

Example 11 may include the apparatus of example 10 and/or some other examples herein, wherein, when the geo-information of the UE is unavailable or unreliable, the central processing circuitry is to: derive geo-information of the UE from the other geo-information associated with the one or more other UEs.

Example 12 may include the apparatus of example 11 and/or some other examples herein, wherein, when the other geo-information of the one or more other UEs is also unavailable or unreliable, the central processing circuitry is to: select the set of the Spectrum resources based on a medium sensing operation; or randomly select the set of the Spectrum resources.

Example 13 may include the apparatus of example 12 and/or some other examples herein, wherein the interface circuitry is to: control receipt of the message from a roadside unit ("RSU"), wherein the RSU is collocated with a GRP of the plurality of GRPs when each of the plurality of GRPs are collocated with a corresponding RSU; or control receipt of the message from a server via an application layer, wherein the server is an application server or a server that implements a core network element.

Example 14 may include the apparatus of example 13 and/or some other examples herein, wherein a first set of Spectrum resources are allocated to a first GSR and a second GSR, and the first GSR and the second GSR are separated by a spatial isolation region.

Example 15 may include the apparatus of example 14 and/or some other examples herein, wherein the Spectrum resources comprise time resources and frequency resources, and each of the plurality of RRPs are associated with a corresponding set of the time resources and a corresponding set of the frequency resources.

Example 16 may include one or more computer-readable media including program code, that when executed by one or more processors of a user equipment ("UE"), cause the UE to: identify, based on an obtained message, an allocation of spectrum resources to each of a plurality of geographical sub-regions ("GSRs"); determine a reference time; obtain geo-information of the UE according to the reference time; select a set of the spectrum resources for vehicle-to-vehicle ("V2V") sidelink transmissions based on a position of the UE relative to a GSR of the plurality of GSRs, wherein the position of the UE is based on the geo-information; and transmit, on the selected set of spectrum resources, the geo-information of the UE. The one or more computer-readable media may be non-transitory computer-readable media.

Example 17 may include the one or more computer-readable media of example 16 and/or some other examples herein, wherein the message further includes a configuration, wherein the configuration is to indicate a geo-information reporting periodicity, a plurality of synchronization sources and a priority associated with each of the plurality of synchronization sources, and wherein the UE, in response to execution of the program code, is to: determine, based on the configuration, a highest priority synchronization source of the plurality of synchronization sources; synchronize with the highest priority synchronization source to identify the reference time; determine individual time instances based on the geo-information reporting periodicity, wherein the individual time instances are to indicate a time at which a timestamp is to be obtained for collected geo-information; collect geo-information of the UE, wherein the position of the UE is based on the collected geo-information; and obtain a timestamp for the collected geo-information at each individual time instance according to the reference time.

Example 18 may include the one or more computer-readable media of example 17 and/or some other examples herein, wherein the message is a first message, and the UE, in response to execution of the program code, is to: encode a second message including the geo-information; and control transmission of the second message and control receipt of a third message according to a UE-autonomous mode or an eNB-controlled mode, wherein in the UE-autonomous mode, the UE, in response to execution of the program code, is to: control transmission of the second message over a physical sidelink control channel ("PSCCH"), a physical sidelink shared channel ("PSSCH"), or physical sidelink discovery channel ("PSDCH") at each individual time instance according to the reference time, and control receipt of the third message over the PSCCH, the PSSCH, or the PSDCH, wherein the third message includes other geo-information associated with one or more other UEs that are within a target communication range of the UE, and wherein in the eNB-controlled mode, the UE, in response to execution of the program code, is to: control transmission of the second message over a physical uplink shared channel ("PUSCH") or a physical uplink control channel ("PUCCH") at each individual time instance according to the reference time, and control receipt of the third message over a physical downlink shared channel ("PDSCH"), a physical downlink control channel ("PDCCH"), or a physical multicast channel ("PMCH").

Example 19 may include the one or more computer-readable media of example 18 and/or some other examples herein, wherein to select the set of the spectrum resources, the UE, in response to execution of the program code, is to: determine a position of the one or more other UEs relative to the position of the UE based on the other geo-information; and select the set of the spectrum resources based on the position of the one or more other UEs with relative to the UE, wherein the set of spectrum resources are spectrum resources that conform with reliability criteria.

Example 20 may include the one or more computer-readable media of example 19 and/or some other examples herein, wherein the allocation includes an association a plurality of geographical reference points ("GRPs") and a plurality of reference spectrum resource points ("RRPs") to corresponding ones of the plurality of GSRs, and wherein the UE, in response to execution of the program code, is to: select the set of the spectrum resources based on the position of the UE relative to positions of the plurality of GRPs or positions of the plurality of RRPs.

Example 21 may include the one or more computer-readable media of example 20 and/or some other examples herein, wherein to select the set of the RF spectrum resources, the UE, in response to execution of the program code, is to: determine a position of one or more GRPs relative to the position of the UE or determine a position of the UE relative to the position of the one or more GRPs; and select the set of the spectrum resources based on a closest GRP of the one or more GRPs, wherein the closest GRP has a position closest to the position of the UE, and wherein the set of spectrum resources are spectrum resources of an RRP associated with the closest GRP.

Example 22 may include the one or more computer-readable media of example 16 and/or some other examples herein, wherein each of the plurality of GRPs are collocated with a corresponding roadside unit ("RSU") and wherein the UE, in response to execution of the program code, is to: control receipt of the message from an RSU, wherein the RSU is collocated with a GRP of the plurality of GRPs.

Example 23 may include the one or more computer-readable media of example 21 and/or some other examples herein, wherein the message further includes a configuration, wherein the configuration is to indicate a report type, a geo-information reporting type, timestamp information, and trigger information.

Example 24 may include the one or more computer-readable media of example 23 and/or some other examples herein, wherein the UE, in response to execution of the program code, is to: determine the individual time instances for collection and reporting of geo-information to be a periodicity within a predefined interval when the geo-information reporting type indicates periodic reporting; or determine the individual time instances for collection and reporting of geo-information to be occurrences of a predetermined event or condition when the geo-information reporting type indicates trigger-based reporting, wherein the trigger information is to indicate the event or condition.

Example 25 may include the one or more computer-readable media of example 24 and/or some other examples herein, wherein the UE, in response to execution of the program code, is to: obtain the timestamp upon collection of the geo-information when the timestamp information indicates to explicitly timestamp the geo-information; obtain the timestamp at a time of reporting collected geo-information when the timestamp information indicates to implicitly timestamp the geo-information; or obtain the timestamp at the individual time instances when the timestamp information indicates to synchronously timestamp the geo-information.

Example 26 may include the one or more computer-readable media of example 25 and/or some other examples herein, wherein the UE, in response to execution of the program code, is to: select the set of the spectrum resources based on one or more of a spatial isolation region; the position of the one or more other UEs relative to the position of the UE; a number of orthogonal time resources of the Spectrum resources; a number of orthogonal frequency resources of the Spectrum resources; a measured received power of each RF resource; or multiple input multiple output ("MIMO") beamforming information.

Example 27 may include the one or more computer-readable media of example 26 and/or some other examples herein, wherein, when the geo-information of the UE is unavailable or unreliable, the UE, in response to execution of the program code, is to: derive geo-information of the UE from the other geo-information associated with the one or more other UEs.

Example 28 may include the one or more computer-readable media of example 27 and/or some other examples herein, wherein, when the other geo-information of the one or more other UEs is also unavailable or unreliable, the UE, in response to execution of the program code, is to: select the set of the Spectrum resources based on a medium sensing operation; or randomly select the set of the spectrum resources.

Example 29 may include the one or more computer-readable media of example 28 and/or some other examples herein, wherein a first set of spectrum resources are allocated to a first GSR and a second GSR, and the first GSR and the second GSR are separated by a spatial isolation region.

Example 30 may include the one or more computer-readable media of example 29 and/or some other examples herein, wherein the spectrum resources comprise time resources and frequency resources, and each of the plurality of RRPs are associated with a corresponding set of the time resources and a corresponding set of the frequency resources.

Example 31 may include an apparatus to be implemented in a base station, the apparatus comprising: central processing circuitry to identify an allocation of spectrum resources to each of a plurality of geographical sub-regions ("GSRs") for one or more vehicle-to-vehicle ("V2V") sidelink transmissions; and encoding circuitry to encode a message for transmission to a user equipment ("UE") wherein the message is to indicate the allocation of spectrum resources to each GSR, wherein the allocation is for selection of a set of the spectrum resources for the one or more V2V sidelink transmissions by the UE based on a GSR of the plurality of GSRs in which the UE is located.

Example 32 may include the apparatus of example 31 and/or some other examples herein, wherein the message further includes a configuration, wherein the configuration indicates one or more synchronization sources from which to identify a reference time, a priority associated with each of the one or more synchronization sources, and a geo-information reporting periodicity, wherein the geo-information reporting periodicity is to indicate individual time instances at which a timestamp for collected geo-information is to be obtained, and wherein collection of the geo-information is for determination of a position of the UE.

Example 33 may include the apparatus of example 32 and/or some other examples herein, wherein the message is a first message, and the apparatus further comprises: interface circuitry to: control transmission of the first message; control receipt of a second message over a physical uplink shared channel ("PUSCH") or a physical uplink control channel ("PUCCH") at each individual time instance according to the reference time, wherein the second message includes geo-information associated with the UE, control transmission, to another UE that is within a target communication range of the UE, of the second message over a physical downlink shared channel ("PDSCH"), a physical downlink control channel ("PDCCH"), or a physical multicast channel ("PMCH"), and control transmission, to the UE, of a third message over the PDSCH, the PDCCH, or the PMCH, wherein the third message includes other geo-information associated with the other UE.

Example 34 may include the apparatus of example 33 and/or some other examples herein, wherein to identify the allocation of spectrum resources, the central processing circuitry is to: identify an association of sets of the spectrum resources to corresponding ones of a plurality of geographical reference points ("GRPs") and corresponding ones of a plurality of reference spectrum resource points ("RRPs").

Example 35 may include the apparatus of example 34 and/or some other examples herein, wherein each of the plurality of GRPs are collocated with a corresponding roadside unit ("RSU"), and wherein to identify the allocation of spectrum resources, the central processing circuitry is to: determine a first RRP of the plurality of RRPs associated with a first GRP collocated with a first RSU; map a set of the spectrum resources associated with the first RRP to corresponding ones of the plurality of GSRs surrounding the first GRP; determine a second RRP of the plurality of RRPs associated with a second GRP collocated with a second RSU, wherein the first GRP and the second GRP are spaced apart by a spatial isolation region; and map the set of the spectrum resources associated with the first RRP to corresponding ones of the plurality of GSRs surrounding the second GRP.

Example 36 may include the apparatus of example 35 and/or some other examples herein, wherein the apparatus further comprises: decoding circuitry to decode the second message to obtain the geo-information, and to decode the third message to obtain the other geo-information, wherein the central processing circuitry is to adjust the allocation of spectrum resources to each GSR based on the geo-information and the other geo-information.

Example 37 may include the apparatus of example 36 and/or some other examples herein, wherein to adjust the allocation of spectrum resources, the central processing circuitry is to: adjust a size and/or shape of each GSR; adjust the geo-information reporting periodicity; adjust a location of one or more GRPs and/or one or more RRPs; or alter a number of spectrum resources associated with one or more GSRs, one or more GRPs, and/or one or more RRPs.

Example 38 may include the apparatus of example 37 and/or some other examples herein, wherein the message further includes a configuration, wherein the configuration is to indicate a report type to indicate a coordinate system and message format for a geo-information report, a geo-information reporting type to indicate periodic or trigger-based reporting, timestamp information to indicate how and when to report the geo-information report, and trigger information to indicate an event or condition for transmission of the geo-information report.

Example 39 may include the apparatus of example 38 and/or some other examples herein, wherein the interface circuitry is to: control receipt of the message from a server via an application layer, wherein the server is an application server or a server that implements a core network element, and wherein the central processing circuitry is to identify the allocation from the message and control storage of the allocation.

Example 40 may include the apparatus of example 39 and/or some other examples herein, wherein a first set of spectrum resources are allocated to a first GSR and a second GSR, and the first GSR and the second GSR are separated by a spatial isolation region, and wherein the spectrum resources comprise time resources and frequency resources, and each of the plurality of RRPs are associated with a corresponding set of the time resources and a corresponding set of the frequency resources.

Example 41 may include one or more computer-readable media including program code, that when executed by one or more processors of a base station ("BS"), cause the BS to: identify a geographic region including a plurality of geographical sub-regions ("GSRs"); allocate spectrum resources to each GSR of the plurality of GSRs for one or more vehicle-to-vehicle ("V2V") sidelink transmissions, wherein the allocation of spectrum resources includes assignment of a same set of the spectrum resources to a first GSR and a second GSR of the plurality of GSRs, wherein the first GSR and the second GSR are spaced apart by a spatial isolation region; encode a message for transmission to a user equipment ("UE") wherein the message is to indicate the allocation of spectrum resources to each GSR, wherein the allocation is for selection of a set of the spectrum resources for the one or more V2V sidelink transmissions by the UE based on a position of the UE relative to a GSR of the plurality of GSRs; and transmit the encoded message to the UE using radio resource control ("RRC") signaling, medium access control ("MAC") signaling, or system information block ("SIB") signaling. The one or more computer-readable media may be non-transitory computer-readable media.

Example 42 may include the one or more computer-readable media of example 41 and/or some other examples herein, wherein the message further includes a configuration, wherein the configuration indicates one or more synchronization sources from which to identify a reference time, a priority associated with each of the one or more synchronizations sources, and a geo-information reporting periodicity, wherein the geo-information reporting periodicity is to indicate individual time instances at which a timestamp for collected geo-information is to be obtained, and wherein collection of the geo-information is for determination of the position of the UE.

Example 43 may include the one or more computer-readable media of example 42 and/or some other examples herein, wherein the message is a first message, and the BS, in response to execution of the program code, is to: control receipt of a second message over a physical uplink shared channel ("PUSCH") or a physical uplink control channel ("PUCCH") at each individual time instance according to the reference time, wherein the second message includes geo-information associated with the UE; control receipt of a third message over the PUSCH or the PUCCH at each individual time instance according to the reference time, wherein the third message includes other geo-information associated with another UE that is within a target communication range of the UE; control transmission, to the other UE, of the second message over a physical downlink shared channel ("PDSCH"), a physical downlink control channel ("PDCCH"), or a physical multicast channel ("PMCH"); and control transmission, to the UE, of the third message over the PDSCH, the PDCCH, or the PMCH.

Example 44 may include the one or more computer-readable media of example 43 and/or some other examples herein, wherein to allocate the spectrum resources, the BS, in response to execution of the program code, is to: associate sets of the spectrum resources to corresponding ones of a plurality of geographical reference points ("GRPs") and corresponding ones of a plurality of reference spectrum resource points ("RRPs").

Example 45 may include the one or more computer-readable media of example 44 and/or some other examples herein, wherein each of the plurality of GRPs are collocated with a corresponding roadside unit ("RSU"), and wherein to allocate the spectrum resources, the BS, in response to execution of the program code, is to: determine a first RRP of the plurality of RRPs associated with a first GRP collocated with a first RSU; map a set of the spectrum resources associated with the first RRP to corresponding ones of the plurality of GSRs surrounding the first GRP; determine a second RRP of the plurality of RRPs associated with a second GRP collocated with a second RSU, wherein the first RRP and the second RRP are spaced apart by a spatial isolation region; and map the set of the spectrum resources associated with the first RRP to corresponding ones of the plurality of GSRs surrounding the second GRP.

Example 46 may include the one or more computer-readable media of example 43 and/or some other examples herein, wherein the BS, in response to execution of the program code, is to: decode the second message to obtain the geo-information of the UE; decode the third message to obtain the other geo-information of the other UE; and adjust the allocation of spectrum resources to each GSR based on the geo-information of the UE and the other geo-information of the other UE.

Example 47 may include the one or more computer-readable media of example 46 and/or some other examples herein, wherein to adjust the allocation of spectrum resources, the BS, in response to execution of the program code, is to: adjust a size and/or shape of each GSR; adjust the geo-information reporting periodicity; adjust a location of one or more GRPs and/or one or more RRPs; or alter a number of spectrum resources associated with one or more GSRs, one or more GRPs, and/or one or more RRPs.

Example 48 may include the one or more computer-readable media of example 47 and/or some other examples herein, wherein the message further includes a configuration, wherein the configuration is to indicate a report type to indicate a coordinate system and message format for a geo-information report, a geo-information reporting type to indicate periodic or trigger-based reporting, timestamp information to indicate how and when to report the geo-information report, and trigger information to indicate an event or condition for transmission of the geo-information report.

Example 49 may include the one or more computer-readable media of example 48 and/or some other examples herein, wherein the BS, in response to execution of the program code, is to: control receipt of the message from a server via an application layer, wherein the server is an application server or a server that implements a core network element; identify the allocation from the message; and control storage of the allocation.

Example 50 may include the one or more computer-readable media of example 49 and/or some other examples herein, wherein a first set of spectrum resources are allocated to a first GSR and a second GSR, and the first GSR and the second GSR are separated by a spatial isolation region.

Example 51 may include an apparatus to be implemented in a user equipment ("UE"), the apparatus comprising: means for identifying an allocation of spectrum resources to each of a plurality of geographical sub-regions ("GSRs"); and means for selecting a set of the spectrum resources for one or more vehicle-to-vehicle ("V2V") sidelink transmissions based on a position of the UE relative to a GSR of the plurality of GSRs.

Example 52 may include the apparatus of example 51 and/or some other examples herein, wherein the message further includes a configuration, wherein the configuration is to indicate a geo-information reporting type and one or more synchronization sources from which to identify a reference time, wherein each of the one or more synchronization sources is associated with a priority, and wherein the apparatus further comprises: means for determining the reference time via synchronization with a highest priority synchronization source of the one or more synchronization sources; means for determining individual time instances for collection and reporting of geo-information based on the geo-information reporting type, wherein the individual time instances are to indicate a time at which geo-information is to be collected with a corresponding timestamp; means for collecting geo-information of the UE, wherein the position of the UE is based on the collected geo-information; and means for timestamping the collected geo-information at each individual time instance according to the reference time.

Example 53 may include the apparatus of example 52 and/or some other examples herein, wherein the message is a first message, and the apparatus further comprises: means for generating and encoding a second message including the geo-information and the timestamp; and means for communicating the one or more V2V transmissions according to a UE-autonomous mode or an evolved nodeB (eNB)-controlled mode, wherein in the UE-autonomous mode, the means for communicating is for: transmitting the second message over a physical sidelink control channel ("PSCCH"), a physical sidelink shared channel ("PSSCH"), or physical sidelink discovery channel ("PSDCH") at each individual time instance according to the reference time, and receiving a third message over the PSCCH, the PSSCH, or the PSDCH, wherein the third message includes other geo-information associated with one or more other UEs that are within a target communication range of the UE; and wherein in the eNB-controlled mode, the means for communicating is for: transmitting the second message over a physical uplink shared channel ("PUSCH") or a physical uplink control channel ("PUCCH") at each individual time instance according to the reference time, and receiving the third message over a physical downlink shared channel ("PDSCH"), a physical downlink control channel ("PDCCH"), or a physical multicast channel ("PMCH").

Example 54 may include the apparatus of example 51 and/or some other examples herein, wherein to select the set of the spectrum resources, the means for selecting is further for: determining, based on the other geo-information, a position of the one or more other UEs relative to the position of the UE; and selecting the set of the spectrum resources based on the position of the one or more other UEs with relative to the UE, wherein the set of spectrum resources are spectrum resources that conform with reliability criteria.

Example 55 may include the apparatus of example 54 and/or some other examples herein, wherein the allocation includes an association a plurality of geographical reference points ("GRPs") and a plurality of reference spectrum resource points ("RRPs") to corresponding ones of the plurality of GSRs, and wherein selection of the set of the spectrum resources is based on the position of the UE relative to positions of the plurality of GRPs or positions of the plurality of RRPs associated with GRPs.

Example 56 may include the apparatus of example 55 and/or some other examples herein, wherein to select the set of the spectrum resources, the means for selecting is further for: determining a position of one or more GRPs relative to the position of the UE or determine a position of the UE relative to the position of the one or more GRPs; and selecting the set of the spectrum resources based on a closest GRP of the one or more GRPs, wherein the closest GRP has a position closest to the position of the UE, and wherein the set of spectrum resources are spectrum resources of an RRP associated with the closest GRP.

Example 57 may include the apparatus of example 56 and/or some other examples herein, wherein the message further includes a configuration, wherein the configuration is to indicate a report type, a geo-information reporting type, timestamp information, and trigger information.

Example 58 may include the apparatus of example 57 and/or some other examples herein, further comprising: means for determining the individual time instances for collection and reporting of geo-information to be a periodicity within a predefined interval when the geo-information reporting type indicates periodic reporting; or means for determining the individual time instances for collection and reporting of geo-information to be occurrences of a predetermined event or condition when the geo-information reporting type indicates trigger-based reporting, wherein the trigger information is to indicate the event or condition.

Example 59 may include the apparatus of example 58 and/or some other examples herein, further comprising: means for obtaining the timestamp upon collection of the geo-information when the timestamp information indicates to explicitly timestamp the geo-information; means for obtaining the timestamp at a time of reporting collected geo-information when the timestamp information indicates to implicitly timestamp the geo-information; or means for obtaining the timestamp at the individual time instances when the timestamp information indicates to synchronously timestamp the geo-information.

Example 60 may include the apparatus of example 59 and/or some other examples herein, wherein the means for selecting is further for selecting the set of the spectrum resources based on one or more of a spatial isolation region; the position of the one or more other UEs relative to the position of the UE; a number of orthogonal time resources of the Spectrum resources; a number of orthogonal frequency resources of the Spectrum resources; a measured received power of each RF resource; or multiple input multiple output ("MIMO") beamforming information.

Example 61 may include the apparatus of example 60 and/or some other examples herein, further comprising: means for deriving or determining geo-information of the UE from the other geo-information associated with the one or more other UEs when the geo-information of the UE is unavailable or unreliable.

Example 62 may include the apparatus of example 61 and/or some other examples herein, further comprising: means for selecting the set of the Spectrum resources based on a medium sensing operation when the other geo-information of the one or more other UEs is also unavailable or unreliable; or means for randomly selecting, according to a random selection procedure, the set of the spectrum resources when the other geo-information of the one or more other UEs is also unavailable or unreliable.

Example 63 may include the apparatus of example 62 and/or some other examples herein, wherein the means for communicating is further for: receiving the message from a roadside unit ("RSU"), wherein the RSU is collocated with a GRP of the plurality of GRPs when each of the plurality of GRPs are collocated with a corresponding RSU; or receiving the message from a server via an application layer, wherein the server is an application server or a server that implements a core network element.

Example 64 may include the apparatus of example 63 and/or some other examples herein, wherein a first set of spectrum resources are allocated to a first GSR and a second GSR, and the first GSR and the second GSR are separated by a spatial isolation region.

Example 65 may include the apparatus of example 64 and/or some other examples herein, wherein the spectrum resources comprise time resources and frequency resources, and each of the plurality of RRPs are associated with a corresponding set of the time resources and a corresponding set of the frequency resources.

Example 66 may include an apparatus to be implemented in a base station, the apparatus comprising: means for identifying an allocation of spectrum resources to each of a plurality of geographical sub-regions ("GSRs") for one or more vehicle-to-vehicle ("V2V") sidelink transmissions; and means for generating and encoding a message for transmission to a user equipment ("UE"), wherein the message is to indicate the allocation of spectrum resources to each GSR, wherein the allocation is for selection of a set of the spectrum resources for the one or more V2V sidelink transmissions by the UE based on a GSR of the plurality of GSRs in which the UE is located.

Example 67 may include the apparatus of example 66 and/or some other examples herein, wherein the message further includes a configuration, wherein the configuration indicates one or more synchronization sources from which to identify a reference time, a priority associated with each of the one or more synchronization sources, and a geo-information reporting periodicity, wherein the geo-information reporting periodicity is to indicate individual time instances at which a timestamp for collected geo-information is to be obtained, and wherein collection of the geo-information is for determination of a position of the UE.

Example 68 may include the apparatus of example 67 and/or some other examples herein, wherein the message is a first message, and the apparatus further comprises: means for communicating comprising: means for transmitting the first message; means for receiving a second message over a physical uplink shared channel ("PUSCH") or a physical uplink control channel ("PUCCH") at each individual time instance according to the reference time, wherein the second message includes geo-information associated with the UE, means for transmitting, to another UE that is within a target communication range of the UE, of the second message over a physical downlink shared channel ("PDSCH"), a physical downlink control channel ("PDCCH"), or a physical multicast channel ("PMCH"), and means for transmitting, to the UE, of a third message over the PDSCH, the PDCCH, or the PMCH, wherein the third message includes other geo-information associated with the other UE.

Example 69 may include the apparatus of example 68 and/or some other examples herein, further comprising: means for allocating the spectrum resources to each of the plurality of GSRs.

Example 70 may include the apparatus of example 69 and/or some other examples herein, wherein the means for allocating the spectrum resources is further for: associating sets of the spectrum resources to corresponding ones of a plurality of geographical reference points ("GRPs") and corresponding ones of a plurality of reference spectrum resource points ("RRPs").

Example 71 may include the apparatus of example 70 and/or some other examples herein, wherein each of the plurality of GRPs are collocated with a corresponding roadside unit ("RSU"), and wherein the means for allocating the spectrum resources is further for: determining a first RRP of the plurality of RRPs associated with a first GRP collocated with a first RSU; mapping a set of the spectrum resources associated with the first RRP to corresponding ones of the plurality of GSRs surrounding the first GRP; determining a second RRP of the plurality of RRPs associated with a second GRP collocated with a second RSU, wherein the first GRP and the second GRP are spaced apart by a spatial isolation region; and mapping the set of the spectrum resources associated with the first RRP to corresponding ones of the plurality of GSRs surrounding the second GRP.

Example 72 may include the apparatus of example 71 and/or some other examples herein, further comprising: means for obtaining the geo-information from the second message, and for obtaining the other geo-information from the third message, wherein the means for allocating the spectrum resources is further for adjusting the allocation of spectrum resources to each GSR based on the geo-information and the other geo-information.

Example 73 may include the apparatus of example 72 and/or some other examples herein, wherein the means for allocating the spectrum resources is further for: adjusting a size and/or shape of each GSR; adjusting the geo-information reporting periodicity; adjusting a location of one or more GRPs and/or one or more RRPs; and/or altering a number of spectrum resources associated with one or more GSRs, one or more GRPs, and/or one or more RRPs.

Example 73 may include the apparatus of example 72 and/or some other examples herein, wherein the message further includes a configuration, wherein the configuration is to indicate a report type to indicate a coordinate system and message format for a geo-information report, a geo-information reporting type to indicate periodic or trigger-based reporting, timestamp information to indicate how and when to report the geo-information report, and trigger information to indicate an event or condition for transmission of the geo-information report.

Example 74 may include the apparatus of example 68 and/or some other examples herein, wherein the means for communicating is further for receiving the message from a server via an application layer, wherein the server is an application server or a server that implements a core network element, and the apparatus further comprises: means for storing the allocation.

Example 75 may include the apparatus of example 74 and/or some other examples herein, wherein a first set of spectrum resources are allocated to a first GSR and a second GSR, and the first GSR and the second GSR are separated by a spatial isolation region, and wherein the spectrum resources comprise time resources and frequency resources, and each of the plurality of RRPs are associated with a corresponding set of the time resources and a corresponding set of the frequency resources.

Example 76 may include a method to be performed by a user equipment ("UE"), the method comprising: identifying, by the UE based on an obtained message, an allocation of spectrum resources to each of a plurality of geographical sub-regions ("GSRs"); determining, by the UE, a reference time; obtaining, by the UE, geo-information of the UE according to the reference time; selecting, by the UE, a set of the spectrum resources for vehicle-to-vehicle ("V2V") sidelink transmissions based on a position of the UE relative to a GSR of the plurality of GSRs, wherein the position of the UE is based on the geo-information; and transmit, by the UE on the selected set of spectrum resources, the geo-information of the UE.

Example 77 may include the method of example 76 and/or some other examples herein, wherein the message further includes a configuration, wherein the configuration is to indicate a geo-information reporting periodicity, a plurality of synchronization sources and a priority associated with each of the plurality of synchronization sources, and the method further comprises: determining, based on the configuration, a highest priority synchronization source of the plurality of synchronization sources; synchronizing with the highest priority synchronization source to identify the reference time; determining individual time instances based on the geo-information reporting periodicity, wherein the individual time instances are to indicate a time at which a timestamp is to be obtained for collected geo-information; collecting geo-information of the UE, wherein the position of the UE is based on the collected geo-information; and obtaining a timestamp for the collected geo-information at each individual time instance according to the reference time.

Example 78 may include the method of example 77 and/or some other examples herein, wherein the message is a first message, and the method further comprises: including or inserting the geo-information in a second message; and communicating the second message and a third message according to a UE-autonomous mode or an eNB-controlled mode, wherein in the UE-autonomous mode, the method comprises: transmitting the second message over a physical sidelink control channel ("PSCCH"), a physical sidelink shared channel ("PSSCH"), or physical sidelink discovery channel ("PSDCH") at each individual time instance according to the reference time, and receiving the third message over the PSCCH, the PSSCH, or the PSDCH, wherein the third message includes other geo-information associated with one or more other UEs that are within a target communication range of the UE, and wherein in the eNB-controlled mode, the method comprises: transmitting the second message over a physical uplink shared channel ("PUSCH") or a physical uplink control channel ("PUCCH") at each individual time instance according to the reference time, and receiving the third message over a physical downlink shared channel ("PDSCH"), a physical downlink control channel ("PDCCH"), or a physical multicast channel ("PMCH").

Example 79 may include the method of example 78 and/or some other examples herein, wherein selecting the set of the spectrum resources comprises: determining a position of the one or more other UEs relative to the position of the UE based on the other geo-information; and selecting the set of the spectrum resources based on the position of the one or more other UEs with relative to the UE, wherein the set of spectrum resources are spectrum resources that conform with reliability criteria.

Example 80 may include the method of example 79 and/or some other examples herein, wherein the allocation includes an association a plurality of geographical reference points ("GRPs") and a plurality of reference spectrum resource points ("RRPs") to corresponding ones of the plurality of GSRs, and the method further comprises: select the set of the spectrum resources based on the position of the UE relative to positions of the plurality of GRPs or positions of the plurality of RRPs.

Example 81 may include the method of example 80 and/or some other examples herein, wherein selecting the set of the spectrum resources comprises: determining a position of one or more GRPs relative to the position of the UE or determine a position of the UE relative to the position of the one or more GRPs; and selecting the set of the spectrum resources based on a closest GRP of the one or more GRPs, wherein the closest GRP has a position closest to the position of the UE, and wherein the set of spectrum resources are spectrum resources of an RRP associated with the closest GRP.

Example 82 may include the method of example 76 and/or some other examples herein, wherein each of the plurality of GRPs are collocated with a corresponding roadside unit ("RSU"), and wherein the method further comprises: receiving the message from an RSU, wherein the RSU is collocated with a GRP of the plurality of GRPs.

Example 83 may include the method of example 81 and/or some other examples herein, wherein the message further includes a configuration, wherein the configuration is to indicate a report type, a geo-information reporting type, timestamp information, and trigger information.

Example 84 may include the method of example 83 and/or some other examples herein, further comprising: determining the individual time instances for collection and reporting of geo-information to be a periodicity within a predefined interval when the geo-information reporting type indicates periodic reporting; or determining the individual time instances for collection and reporting of geo-information to be occurrences of a predetermined event or condition when the geo-information reporting type indicates trigger-based reporting, wherein the trigger information is to indicate the event or condition.

Example 85 may include the method of example 84 and/or some other examples herein, further comprising: obtaining the timestamp upon collection of the geo-information when the timestamp information indicates to explicitly timestamp the geo-information; obtaining the timestamp at a time of reporting collected geo-information when the timestamp information indicates to implicitly timestamp the geo-information; or obtaining the timestamp at the individual time instances when the timestamp information indicates to synchronously timestamp the geo-information.

Example 86 may include the method of example 85 and/or some other examples herein, wherein the selecting comprises selecting the set of the spectrum resources based on one or more of a spatial isolation region; the position of the one or more other UEs relative to the position of the UE; a number of orthogonal time resources of the spectrum resources; a number of orthogonal frequency resources of the Spectrum resources; a measured received power of each RF resource; or multiple input multiple output ("MIMO") beamforming information.

Example 87 may include the method of example 86 and/or some other examples herein, further comprising:

determining whether the geo-information of the UE is unavailable or unreliable; and determining geo-information of the UE from the other geo-information associated with the one or more other UEs when the geo-information of the UE is unavailable or unreliable.

Example 88 may include the method of example 87 and/or some other examples herein, further comprising: determining whether the other geo-information of the one or more other UEs is unavailable or unreliable; and when the other geo-information of the one or more other UEs is unavailable or unreliable, selecting the set of the spectrum resources based on a medium sensing operation; or randomly selecting the set of the spectrum resources.

Example 89 may include the method of example 88 and/or some other examples herein, wherein a first set of spectrum resources are allocated to a first GSR and a second GSR, and the first GSR and the second GSR are separated by a spatial isolation region.

Example 90 may include the method of example 89 and/or some other examples herein, wherein the spectrum resources comprise time resources and frequency resources, and each of the plurality of RRPs are associated with a corresponding set of the time resources and a corresponding set of the frequency resources.

Example 101 may include a computer-implemented method comprising: identifying, by a computer device, a geographic region including a plurality of geographical sub-regions ("GSRs"); allocating, by the computer device, spectrum resources to each GSR of the plurality of GSRs for one or more vehicle-to-vehicle ("V2V") sidelink transmissions, wherein the allocation of spectrum resources includes assignment of a same set of the spectrum resources to a first GSR and a second GSR of the plurality of GSRs, wherein the first GSR and the second GSR are spaced apart by a spatial isolation region; encoding, by the computer device, a message for transmission to a user equipment ("UE") wherein the message is to indicate the allocation of spectrum resources to each GSR, wherein the allocation is for selection of a set of the spectrum resources for the one or more V2V sidelink transmissions by the UE based on a position of the UE relative to a GSR of the plurality of GSRs; and sending, by the computer device the encoded message to the UE.

Example 102 may include the method of example 101 and/or some other examples herein, wherein the message further includes a configuration, wherein the configuration indicates one or more synchronization sources from which to identify a reference time, a priority associated with each of the one or more synchronizations sources, and a geo-information reporting periodicity, wherein the geo-information reporting periodicity is to indicate individual time instances at which a timestamp for collected geo-information is to be obtained, and wherein collection of the geo-information is for determination of the position of the UE.

Example 103 may include the method of example 102 and/or some other examples herein, wherein the message is a first message, and the method further comprises: receiving a second message over a physical uplink shared channel ("PUSCH") or a physical uplink control channel ("PUCCH") at each individual time instance according to the reference time, wherein the second message includes geo-information associated with the UE; receiving a third message over the PUSCH or the PUCCH at each individual time instance according to the reference time, wherein the third message includes other geo-information associated with another UE that is within a target communication range of the UE; transmitting, to the other UE, of the second message over a physical downlink shared channel ("PDSCH"), a physical downlink control channel ("PDCCH"), or a physical multicast channel ("PMCH"); and transmitting, to the UE, of the third message over the PDSCH, the PDCCH, or the PMCH.

Example 104 may include the method of example 103 and/or some other examples herein, wherein allocating the spectrum resources comprises: associating sets of the spectrum resources to corresponding ones of a plurality of geographical reference points ("GRPs") and corresponding ones of a plurality of reference spectrum resource points ("RRPs").

Example 105 may include the method of example 104 and/or some other examples herein, wherein each of the plurality of GRPs are collocated with a corresponding roadside unit ("RSU"), and allocating the spectrum resources comprises: determining a first RRP of the plurality of RRPs associated with a first GRP collocated with a first RSU; mapping a set of the spectrum resources associated with the first RRP to corresponding ones of the plurality of GSRs surrounding the first GRP; determining a second RRP of the plurality of RRPs associated with a second GRP collocated with a second RSU, wherein the first RRP and the second RRP are spaced apart by a spatial isolation region; and mapping the set of the spectrum resources associated with the first RRP to corresponding ones of the plurality of GSRs surrounding the second GRP.

Example 106 may include the method of example 103 and/or some other examples herein, further comprising: obtaining the geo-information of the UE from the second message; obtaining the other geo-information of the other UE from the third message; and adjusting the allocation of spectrum resources to each GSR based on the geo-information of the UE and the other geo-information of the other UE.

Example 107 may include the method of example 106 and/or some other examples herein, wherein adjusting the allocation of spectrum resources comprises: adjusting a size and/or shape of each GSR; adjusting the geo-information reporting periodicity; adjusting a location of one or more GRPs and/or one or more RRPs; or altering a number of spectrum resources associated with one or more GSRs, one or more GRPs, and/or one or more RRPs.

Example 108 may include the method of example 107 and/or some other examples herein, wherein the message further includes a configuration, wherein the configuration is to indicate a report type to indicate a coordinate system and message format for a geo-information report, a geo-information reporting type to indicate periodic or trigger-based reporting, timestamp information to indicate how and when to report the geo-information report, and trigger information to indicate an event or condition for transmission of the geo-information report.

Example 109 may include the method of example 108 and/or some other examples herein, further comprising: receiving the message from a server via an application layer, wherein the server is an application server or a server that implements a core network element; identifying the allocation from the message; and storing the allocation in a memory associated with the computer device.

Example 110 may include the method of example 109 and/or some other examples herein, wherein a first set of spectrum resources are allocated to a first GSR and a second GSR, and the first GSR and the second GSR are separated by a spatial isolation region.

Example 111 may include one or more non-transitory computer readable media including program code, which when executed by one or more processors, causes a computer device to perform the method of any one of examples 76-110 and/or some other examples or processes, or portions thereof, as discussed herein.

The foregoing description of the above Examples provides illustration and description for the example embodiments disclosed herein, but the above Examples are not intended to be exhaustive or to limit the scope of the invention to the precise form disclosed. Modifications and variations are possible in light of the above teachings and/or may be acquired from practice of various implementations of the invention.

The invention claimed is:

1. An apparatus to be implemented in a user equipment ("UE"), the apparatus comprising:
   decoding circuitry to decode a message, received from a base station and including an allocation of spectrum resources to one or more GSRs of a plurality of geographical sub-regions ("GSRs"), to obtain the allocation of the spectrum resources to the plurality of GSRs; and
   central processing circuitry to:
   determine, based at least on geo-information associated with one or more other UEs that are within a target communication range of the UE, a position of the one or more other UEs relative to the position of the UE; and
   select a set of the spectrum resources for one or more vehicle-to-vehicle ("V2V") sidelink transmissions based at least on (i) a position of the UE relative to a GSR of the plurality of GSRs and (ii) the position of the one or more other UEs relative to the position of the UE, wherein the set of spectrum resources are spectrum resources that conform with reliability criteria.

2. The apparatus of claim 1, wherein the message further includes a configuration, wherein the configuration is to indicate a geo-information reporting type and one or more synchronization sources from which to identify a reference time, wherein each of the one or more synchronization sources is associated with a priority, and wherein the central processing circuitry is to:
   determine the reference time via synchronization with a highest priority synchronization source of the one or more synchronization sources;
   determine individual time instances for collection and reporting of geo-information based on the geo-information reporting type, wherein the individual time instances are to indicate a time at which geo-information is to be collected with a corresponding timestamp;
   collect geo-information of the UE, wherein the position of the UE is based on the collected geo-information; and
   obtain a timestamp for the collected geo-information at each individual time instance according to the reference time.

3. The apparatus of claim 2, wherein the message is a first message, and the apparatus further comprises:
   encoding circuitry to encode a second message including the geo-information and the timestamp; and
   interface circuitry to operate in a UE-autonomous mode or a base station-controlled mode, wherein in the UE-autonomous mode, the interface circuitry is to:
   control transmission of the second message over a physical sidelink control channel ("PSCCH"), a physical sidelink shared channel ("PSSCH"), or a physical sidelink discovery channel ("PSDCH") at each individual time instance according to the reference time, and
   control receipt of a third message over the PSCCH, the PSSCH, or the PSDCH, wherein the third message includes other geo-information associated with the one or more other UEs that are within a target communication range of the UE; and
   wherein in the base station-controlled mode, the interface circuitry is to:
   control transmission of the second message over a physical uplink shared channel ("PUSCH") or a physical uplink control channel ("PUCCH") at each individual time instance according to the reference time, and
   control receipt of the third message over a physical downlink shared channel ("PDSCH"), a physical downlink control channel ("PDCCH"), or a physical multicast channel ("PMCH").

4. The apparatus of claim 1, wherein the allocation includes an association a plurality of geographical reference points ("GRPs") and a plurality of reference spectrum resource points ("RRPs") to corresponding ones of the plurality of GSRs, and wherein selection of the set of the spectrum resources is based on the position of the UE relative to positions of the plurality of GRPs or positions of the plurality of RRPs associated with GRPs.

5. The apparatus of claim 4, wherein to select the set of the spectrum resources, the central processing circuitry is further to:
   determine a position of one or more GRPs relative to the position of the UE or determine a position of the UE relative to the position of the one or more GRPs; and
   select the set of the spectrum resources based on a closest GRP of the one or more GRPs, wherein the closest GRP has a position closest to the position of the UE, and wherein the set of spectrum resources are spectrum resources of an RRP associated with the closest GRP.

6. One or more non-transitory computer-readable media including program code, that when executed by one or more processors of a user equipment ("UE"), cause the UE to:
   identify, based on a message received from a base station and including an allocation of spectrum resources to one or more GSRs of a plurality of geographical sub-regions ("GSRs"), the allocation of the spectrum resources to the plurality of GSRs;
   determine a reference time based at least on information received from a synchronization source;
   obtain geo-information of the UE according to the reference time;
   determine, based on geo-information associated with one or more other UEs that are within a target communication range of the UE, a position of the one or more other UEs relative to the position of the UE, wherein the position of the UE is based on the obtained geo-information of the UE;
   select a set of the spectrum resources for vehicle-to-vehicle ("V2V") sidelink transmissions based on (i) a position of the UE relative to a GSR of the plurality of GSRs, and (ii) the position of the one or more other UEs relative to the position of the UE, wherein the set of spectrum resources are spectrum resources that conform with reliability criteria; and
   transmit, on the selected set of spectrum resources, the geo-information of the UE.

7. The one or more non-transitory computer-readable media of claim 6, wherein the message further includes a configuration, wherein the configuration is to indicate a geo-information reporting periodicity, a plurality of synchronization sources and a priority associated with each of the plurality of synchronization sources, and wherein the UE, in response to execution of the program code, is to:
  determine, based on the configuration, a highest priority synchronization source of the plurality of synchronization sources;
  synchronize with the highest priority synchronization source to identify the reference time;
  determine individual time instances based on the geo-information reporting periodicity, wherein the individual time instances are to indicate a time at which a timestamp is to be obtained for collected geo-information;
  collect geo-information of the UE, wherein the position of the UE is based on the collected geo-information; and
  obtain a timestamp for the collected geo-information at each individual time instance according to the reference time.

8. The one or more non-transitory computer-readable media of claim 7, wherein the message is a first message, and the UE, in response to execution of the program code, is to:
  encode a second message including the geo-information; and
  control transmission of the second message and control receipt of a third message according to a UE-autonomous mode or a base station-controlled mode,
  wherein in the UE-autonomous mode, the UE, in response to execution of the program code, is to:
  control transmission of the second message over a physical sidelink control channel ("PSCCH"), a physical sidelink shared channel ("PSSCH"), or physical sidelink discovery channel ("PSDCH") at each individual time instance according to the reference time, and
  control receipt of the third message over the PSCCH, the PSSCH, or the PSDCH, wherein the third message includes other geo-information associated with one or more other UEs that are within a target communication range of the UE, and
  wherein in the base station-controlled mode, the UE, in response to execution of the program code, is to:
  control transmission of the second message over a physical uplink shared channel ("PUSCH") or a physical uplink control channel ("PUCCH") at each individual time instance according to the reference time, and
  control receipt of the third message over a physical downlink shared channel ("POSCH"), a physical downlink control channel ("PDCCH"), or a physical multicast channel ("PMCH").

9. The one or more non-transitory computer-readable media of claim 8, wherein to select the set of the spectrum resources, the UE, in response to execution of the program code, is to:
  determine a position of the one or more other UEs relative to the position of the UE based on the other geo-information; and
  select the set of the spectrum resources based on the position of the one or more other UEs with relative to the UE, wherein the set of spectrum resources are spectrum resources that conform with reliability criteria.

10. The one or more non-transitory computer-readable media of claim 6, wherein the allocation includes an association a plurality of geographical reference points ("GRPs") and a plurality of reference spectrum resource points ("RRPs") to corresponding ones of the plurality of GSRs, and wherein the UE, in response to execution of the program code, is to:
  select the set of the spectrum resources based on the position of the UE relative to positions of the plurality of GRPs or positions of the plurality of RRPs.

11. The one or more non-transitory computer-readable media of claim 10, wherein to select the set of the RF spectrum resources, the UE, in response to execution of the program code, is to:
  determine a position of one or more GRPs relative to the position of the UE or determine a position of the UE relative to the position of the one or more GRPs; and
  select the set of the spectrum resources based on a closest GRP of the one or more GRPs, wherein the closest GRP has a position closest to the position of the UE, and wherein the set of spectrum resources are spectrum resources of an RRP associated with the closest GRP.

12. The one or more non-transitory computer-readable media of claim 6, wherein each of the plurality of GRPs are collocated with a corresponding roadside unit ("RSU") and wherein the UE, in response to execution of the program code, is to:
  control receipt of the message from an RSU, wherein the RSU is collocated with a GRP of the plurality of GRPs.

13. An apparatus to be implemented in a base station, the apparatus comprising:
  central processing circuitry to identify an allocation of spectrum resources to one or more GSRs of a plurality of geographical sub-regions ("GSRs") for one or more vehicle-to-vehicle ("V2V") sidelink transmissions, wherein the allocation of the spectrum resources is based at least on associating sets of the spectrum resources to corresponding ones of a plurality of geographical reference points ("GRPs") and corresponding ones of a plurality of reference spectrum resource points ("RRPs"); and
  encoding circuitry to encode a message for transmission to a user equipment ("UE") wherein the message is to indicate the allocation of spectrum resources to the one or more GSRs, wherein the allocation is for selection of a set of the spectrum resources for one or more V2V sidelink transmissions by the UE based on a GSR of the plurality of GSRs in which the UE is located.

14. The apparatus of claim 13, wherein the message further includes a configuration, wherein the configuration indicates one or more synchronization sources from which to identify a reference time, a priority associated with each of the one or more synchronization sources, and a geo-information reporting periodicity, wherein the geo-information reporting periodicity is to indicate individual time instances at which a timestamp for collected geo-information is to be obtained, and wherein collection of the geo-information is for determination of a position of the UE.

15. The apparatus of claim 14, wherein the message is a first message, and the apparatus further comprises:
  interface circuitry to:
    control receipt of a second message over a physical uplink shared channel ("PUSCH") or a physical uplink control channel ("PUCCH") at each individual time instance according to the reference time, wherein the second message includes geo-information associated with the UE,
    control transmission, to another UE that is within a target communication range of the UE, of the second message over a physical downlink shared channel ("PDSCH"), a physical downlink control channel ("PDCCH"), or a physical multicast channel ("PMCH"), and control transmission, to the UE, of a third message over the PDSCH, the PDCCH, or the PMCH, wherein the third message includes other geo-information associated with the other UE.

16. The apparatus of claim 15, wherein the apparatus further comprises:

decoding circuitry to decode the second message to obtain the geo-information, and to decode the third message to obtain the other geo-information, wherein the central processing circuitry is to adjust the allocation of spectrum resources to the one or more GSRs based on the geo-information and the other geo-information.

17. The apparatus of claim 13, wherein each of the plurality of GRPs are collocated with a corresponding roadside unit ("RSU") and wherein to allocate the spectrum resources, the central processing circuitry is to:

determine a first RRP of the plurality of RRPs associated with a first GRP collocated with a first RSU;

map a set of the spectrum resources associated with the first RRP to corresponding ones of the plurality of GSRs surrounding the first GRP;

determine a second RRP of the plurality of RRPs associated with a second GRP collocated with a second RSU, wherein the first GRP and the second GRP are spaced apart by a spatial isolation region; and map the set of the spectrum resources associated with the first RRP to corresponding ones of the plurality of GSRs surrounding the second GRP.

18. One or more non-transitory computer-readable media including program code, that when executed by one or more processors of a base station ("BS"), cause the BS to:

identify a geographic region including a plurality of geographical sub-regions ("GSRs");

allocate spectrum resources to one or more GSRs of the plurality of GSRs for one or more vehicle-to-vehicle ("V2V") sidelink transmissions, wherein the allocation of spectrum resources includes assignment of a same set of the spectrum resources to a first GSR and a second GSR of the plurality of GSRs, wherein the first GSR and the second GSR are spaced apart by a spatial isolation region, and wherein the allocation of the spectrum resources is based at least on associating sets of the spectrum resources to corresponding ones of a plurality of geographical reference points ("GRPs") and corresponding ones of a plurality of reference spectrum resource points ("RRPs");

encode a message for transmission to a user equipment ("UE") wherein the message is to indicate the allocation of spectrum resources to the one or more GSRs, wherein the allocation is for selection of a set of the spectrum resources for the one or more V2V sidelink transmissions by the UE based on a position of the UE relative to a GSR of the plurality of GSRs; and transmit the encoded message to the UE using radio resource control (RRC) signaling, medium access control (MAC) signaling, or system information block (SIB) signaling.

19. The one or more non-transitory computer-readable media of claim 18, wherein the message further includes a configuration, wherein the configuration indicates one or more synchronization sources from which to identify a reference time, a priority associated with each of the one or more synchronizations sources, and a geo-information reporting periodicity, wherein the geo-information reporting periodicity is to indicate individual time instances at which a timestamp for collected geo-information is to be obtained, and wherein collection of the geo-information is for determination of the position of the UE.

20. The one or more non-transitory computer-readable media of claim 19, wherein the message is a first message, and the BS, in response to execution of the program code, is to:

control receipt of a second message over a physical uplink shared channel ("PUSCH") or a physical uplink control channel ("PUCCH") at each individual time instance according to the reference time, wherein the second message includes geo-information associated with the UE;

control receipt of a third message over the PUSCH or the PUCCH at each individual time instance according to the reference time, wherein the third message includes other geo-information associated with another UE that is within a target communication range of the UE;

control transmission, to the other UE, of the second message over a physical downlink shared channel ("PDSCH"), a physical downlink control channel ("PDCCH"), or a physical multicast channel ("PMCH"); and control transmission, to the UE, of the third message over the PDSCH, the PDCCH, or the PMCH.

21. The one or more non-transitory computer-readable media of claim 20, wherein the BS, in response to execution of the program code, is to:

decode the second message to obtain the geo-information of the UE;

decode the third message to obtain the other geo-information of the other UE; and adjust the allocation of spectrum resources to the one or more GSRs based on the geo-information of the UE and the other geo-information of the other UE.

22. The one or more non-transitory computer-readable media of claim 18, wherein each of the plurality of GRPs are collocated with a corresponding roadside unit ("RSU"), and wherein to allocate the spectrum resources, the BS, in response to execution of the program code, is to:

determine a first RRP of the plurality of RRPs associated with a first GRP collocated with a first RSU;

map a set of the spectrum resources associated with the first RRP to corresponding ones of the plurality of GSRs surrounding the first GRP;

determine a second RRP of the plurality of RRPs associated with a second GRP collocated with a second RSU, wherein the first RRP and the second RRP are spaced apart by a spatial isolation region; and map the set of the spectrum resources associated with the first RRP to corresponding ones of the plurality of GSRs surrounding the second GRP.

\* \* \* \* \*

UNITED STATES PATENT AND TRADEMARK OFFICE
CERTIFICATE OF CORRECTION

PATENT NO.         : 10,798,673 B2                                      Page 1 of 1
APPLICATION NO.    : 16/080559
DATED              : October 6, 2020
INVENTOR(S)        : Alexey Khoryaev et al.

It is certified that error appears in the above-identified patent and that said Letters Patent is hereby corrected as shown below:

On the Title Page

Item [72], delete "Zavolzhie (RU);" and insert -- Zavolzhye (RU); --; and

In the Claims

Column 49, Line 49, in Claim 8, delete "("POSCH")," and insert -- ("PDSCH"), --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*